(12) United States Patent
Nishikawa

(10) Patent No.: US 10,247,268 B2
(45) Date of Patent: Apr. 2, 2019

(54) BRAKE DEVICE

(71) Applicant: NTN CORPORATION, Osaka (JP)

(72) Inventor: Akiyoshi Nishikawa, Iwata (JP)

(73) Assignee: NTN CORPORATION, Osaka (JP)

( * ) Notice: Subject to any disclaimer, the term of this patent is extended or adjusted under 35 U.S.C. 154(b) by 100 days.

(21) Appl. No.: 15/296,492

(22) Filed: Oct. 18, 2016

(65) Prior Publication Data

US 2017/0037919 A1 Feb. 9, 2017

Related U.S. Application Data

(63) Continuation of application No. PCT/JP2015/061402, filed on Apr. 13, 2015.

(30) Foreign Application Priority Data

Apr. 22, 2014 (JP) .................................. 2014-088477
Apr. 22, 2014 (JP) .................................. 2014-088478

(51) Int. Cl.
*B60T 8/17* (2006.01)
*F16D 65/18* (2006.01)
(Continued)

(52) U.S. Cl.
CPC ................ *F16D 65/18* (2013.01); *B60T 8/17* (2013.01); *B60T 13/74* (2013.01); *F16D 2121/24* (2013.01); *F16D 2125/42* (2013.01)

(58) Field of Classification Search
CPC .. F16D 65/18; F16D 2121/24; F16D 2125/42; B60T 8/17; B60T 13/74; B60T 13/741; B60T 13/746

(Continued)

(56) References Cited

U.S. PATENT DOCUMENTS 5,362,139 A 11/1994 Watanabe
5,387,031 A 2/1995 Watanabe
(Continued)

FOREIGN PATENT DOCUMENTS

CN 1098055 A 2/1995
CN 1521046 A 8/2004
(Continued)

OTHER PUBLICATIONS

Japanese Notification of Reason(s) of Rejection dated Dec. 5, 2017 in corresponding Japanese Patent Application No. 2014-088478.
(Continued)

*Primary Examiner* — Thomas W Irvin

(57) ABSTRACT

Provided is a brake device that is able to achieve an improvement in versatility of the device, and which is able to reduce an uncomfortable feeling and annoyance caused by an operating noise of a parking brake. This brake device includes: left and right parking brake mechanisms configured to independently apply braking forces to left and right wheels of a vehicle, respectively, and hold the vehicle stationary; and a control device configured to control these parking brake mechanisms. The control device includes a parking brake actuation determiner configured to adjust respective timings at which the left and right parking brake mechanisms are actuated so as to reduce an uncomfortable feeling caused to an occupant of the vehicle.

12 Claims, 14 Drawing Sheets

(51) Int. Cl.
*B60T 13/74* (2006.01)
*F16D 121/24* (2012.01)
*F16D 125/42* (2012.01)

(58) Field of Classification Search
USPC .......................................... 303/189, 191, 89
See application file for complete search history.

(56) References Cited

U.S. PATENT DOCUMENTS

| | | | |
|---|---|---|---|
| 7,136,737 | B2 | 11/2006 | Ashizawa et al. |
| 7,448,699 | B2 | 11/2008 | Manaka |
| 8,746,419 | B2 | 6/2014 | Roll et al. |
| 8,839,691 | B2 * | 9/2014 | Krompass ............... B60T 7/105 188/265 |
| 2004/0104619 | A1 | 6/2004 | Manaka |
| 2004/0122579 | A1 | 6/2004 | Ashizawa et al. |
| 2007/0084682 | A1 * | 4/2007 | Griffith .................... B60T 8/00 188/156 |
| 2012/0090928 | A1 | 4/2012 | Roll et al. |
| 2015/0094925 | A1 * | 4/2015 | Senoo .................... B60T 1/005 701/70 |

FOREIGN PATENT DOCUMENTS

| | | |
|---|---|---|
| CN | 102395493 A | 3/2012 |
| DE | 10 2010003232 A1 | 10/2010 |
| JP | 2004-175164 | 6/2004 |
| JP | 2005-17453 | 1/2005 |
| JP | 2009-149209 | 7/2009 |
| JP | 2010-241271 | 10/2010 |
| JP | 4680643 | 2/2011 |
| JP | 2012-193802 | 10/2012 |
| JP | 2013-130255 | 7/2013 |
| JP | 2014-46824 | 3/2014 |
| WO | WO 2012/124811 A1 | 9/2012 |

OTHER PUBLICATIONS

Japanese Notification of Reason(s) of Rejection dated Dec. 19, 2017 in corresponding Japanese Patent Application No. 2014-088477.
International Search Report dated Jul. 7, 2015 in corresponding International Application No. PCT/JP2015/061402.
Extended European Search Report dated Jul. 11, 2017 in corresponding European Patent Application No. 15783276.7.
International Preliminary Report on Patentability dated Nov. 3, 2016 in corresponding International Patent Application No. PCT/JP2015/061402.
Japanese Office Action dated Jul. 10, 2018 in corresponding Japanese Patent Application No. 2014-088478.
Chinese Office Action dated Jun. 28, 2018 in corresponding Chinese Patent Application No. 201580020709.0.

* cited by examiner

OUTBOARD SIDE ← → INBOARD SIDE

PARKING LOCK IS OFF

PARKING LOCK IS ON

BRAKE DEVICE

CROSS REFERENCE TO THE RELATED APPLICATION

This application is a continuation application, under 35 U.S.C. § 111(a), of international application No. PCT/JP2015/061402, filed Apr. 13, 2015, which is based on and claims Convention priority to Japanese patent application No. 2014-088477, filed Apr. 22, 2014, and Japanese patent application No. 2014-088478, filed Apr. 22, 2014, the entire disclosures of which are herein incorporated by reference as a part of this application.

BACKGROUND OF THE INVENTION

Field of the Invention

The present invention relates to a brake device including independent left and right mechanisms, and relates to a technique for reducing an operating noise that occurs when a parking brake is actuated.

Description of Related Art

A brake device has been proposed in which an electric motor is used as a driving source to generate a braking force and the braking force can be maintained even after supply of electricity to the electric motor is stopped. In a vehicle on which this brake device is installed, an operating noise is generated when a parking brake is actuated, and this operating noise may cause an uncomfortable feeling or annoyance. Specific examples of such operating noises include a noise that is generated from a ratchet fitted in a pressure generating mechanism, a noise that is generated when a lock mechanism is locked, and a noise that is generated when a pressure that causes a braking force increases, and there is a demand to reduce an uncomfortable feeling or annoyance caused by such a noise.

Examples of methods for reducing the uncomfortable feeling or annoyance caused by an operating noise that occurs when the parking brake is actuated include a method to reduce the sound pressure level of the operating noise, and a method to reduce the likelihood that the noise will cause an uncomfortable feeling or annoyance. As an example of the first method, a method of optimizing the structures and configuration of a motor and a speed reducer (or a reduction gear) of an electric brake device equipped with an electric parking brake so as to reduce the operating noise has been proposed (Patent Document 1). In addition, in an electric parking device, since an impact that is made when an output shaft of a motor is locked causes an operating noise, a method of providing a projecting portion or a recessed portion of an engagement portion of a lock mechanism with an elastic portion to reduce the operating noise has been proposed (Patent Document 2).

As an example of the second method, there has been proposed a method of generating an electronic sound alerting an occupant of a vehicle from a start of an operation of a parking brake to an end thereof to notify the occupant of the operation of the brake, and, through the notification, impressing on the occupant the fact that an occurrence of an operating noise is a normal phenomenon due to the operation of the parking brake, thus allowing the occupant to feel at ease, and making it hard for the occupant to perceive any operating noise due to the electronic sound (Patent Document 3).

RELATED DOCUMENT

Patent Document

[Patent Document 1] JP Laid-Open Patent Publication No. 2013-130255
[Patent Document 2] JP Laid-Open Patent Publication No. 2012-193802
[Patent Document 3] Japanese Patent No. 4680643

The technique of Patent Document 1, which optimizes the structures and configuration of the motor and the speed reducer, limits the structures and configuration of the motor and the speed reducer, resulting in a reduction in versatility of the electric brake device equipped with the parking brake. The technique of Patent Document 2, which provides the lock mechanism with the elastic portion, leads to complicated device structure and an increase in production cost. This technique is unable to reduce an operating noise caused by a gear rattle of the speed reducer which reduces the speed of rotation (or a number of rotation per a unit time) of the electric motor, an operating noise of an actuator of the lock mechanism, or the like.

The technique of Patent Document 3, which generates the electronic sound, may not be able to properly reduce the operating noise, which occurs when the parking brake is actuated, depending on the magnitude, frequency range, or the like of the electronic sound, for example, and also may allow the electronic sound itself to be a cause of an operating noise. Such an operating noise may cause an uncomfortable feeling or annoyance to a driver or passenger(s).

SUMMARY OF THE INVENTION

An object of the present invention is to provide a brake device that is able to achieve an improvement in versatility of the device, and which is able to reduce an uncomfortable feeling and annoyance caused by an operating noise of a parking brake.

Hereinafter, the present invention will be described with reference to reference numerals used in descriptions of embodiments thereof for the sake of convenience and easier understanding.

A brake device of the present invention includes: left and right parking brake mechanisms 1L and 1R configured to independently apply braking forces to left and right wheels of a vehicle, respectively, and hold the vehicle stationary; and a control device 2 configured to control these parking brake mechanisms 1L and 1R, the control device 2 including a parking brake actuation determiner 12 configured to adjust respective timings at which the left and right parking brake mechanisms 1L and 1R are actuated so as to reduce an uncomfortable feeling caused to an occupant of the vehicle.

In order to reduce the uncomfortable feeling or annoyance caused by operating noises of parking brakes, measures having various and composite approaches can overall achieve an increase in quietness. The present applicant has found that reductions in the uncomfortable feeling and annoyance can be achieved by a measure related to control, such as optimizing timings at which actuation commands are generated, as well as by reducing the sound pressure level of the operating noise by a mechanical approach, or by using the electronic sound to reduce the uncomfortable feeling and annoyance, as described above.

In the case of the left and right parking brake mechanisms configured to independently apply the braking forces to the left and right wheels, respectively, respective actuation timings can also be determined independently. Thus, with a focus on an operating noise that is most likely to cause the uncomfortable feeling or annoyance of all operating noises that occur when the parking brakes are actuated (hereinafter referred to simply as an "operating noise"), timings at which the actuation commands are generated may be controlled to manage timings at which operating noises are generated, for example, thereby to reduce the uncomfortable feeling and annoyance caused to a driver or the like by the operating noises. Thus, reductions in the uncomfortable feeling and annoyance caused by the operating noises of the parking brakes can be achieved.

According to the above structure, the control device 2 switches the state of each of the left and right parking brake mechanisms 1L and 1R respectively from an unlocked state to a parking lock state in response to an operation of a parking brake request switch 13 or the like by the driver, for example. At this time, the parking brake actuation determiner 12 of the control device 2 adjusts the timing at which each of the left and right parking brake mechanisms 1L and 1R is actuated. For example, a process of reconfiguring a control flow of the control device 2 may be performed to reduce the uncomfortable feeling and annoyance caused by the operating noise, which does not restrict the structure or arrangement of components as in related art. This leads to the improvement in versatility of the brake device.

Timings at which the operating noises are generated and which reduce the uncomfortable feeling and annoyance are previously set at the time of design of the vehicle on the basis of the sound pressure level and frequency distribution of each operating noise, the arrangement of the parking brake mechanisms 1L and 1R, the method of fitting the parking brake mechanisms 1L and 1R, the transmission path of each operating noise to the vehicle, resonance, and chattering.

For example, when the sound pressure level of the operating noise is low, simultaneous actuation of the left and right parking brake mechanisms 1L and 1R does not lead to a high sound pressure level, and shortening the duration of the operating noise leads to reductions in the uncomfortable feeling and annoyance. Meanwhile, in the case where an effect of shielding the operating noise and/or an effect of suppressing vibration that contributes to the operating noise can be expected from the structure of the vehicle, increases in the operating noise and the amplitude of the vibration would not lead to a high sound pressure level perceived by the occupant of the vehicle. Then, similarly to the above-described example, the left and right parking brake mechanisms 1L and 1R may be actuated simultaneously to shorten the durations of the operating noise and the vibration thereby to reduce the uncomfortable feeling and annoyance.

Here, the duration of the operating noise refers to a period during which the operating noise is perceived by the occupant, and a duration in the case where the left and right parking brake mechanisms 1L and 1R are actuated simultaneously is equal to a duration of a normal operation, and a duration in the case where one parking brake mechanism 1L (1R) is actuated first, and the other parking brake mechanism 1R (1L) is actuated immediately after the operation of the one parking brake mechanism 1L (1R) is completed so as to operate consecutively, is twice the duration of the normal operation.

In contrast to the above examples, when the sound pressure level of the operating noise is high, the left and right parking brake mechanisms 1L and 1R may be actuated one after the other in succession, at different timings, to prevent the sound pressure level from having a high peak, so that the uncomfortable feeling and annoyance can be reduced. Further, in the case where the effect of shielding the operating noise and/or the effect of suppressing the vibration that contributes to the operating noise cannot be expected from the structure of the vehicle, more specifically, in the case where air-borne noise tends to easily occur or where resonance or chattering noise (beat noise) tends to easily occur, the left and right parking brake mechanisms 1L and 1R may be actuated one after the other in succession to reduce the operating noise and the amplitude of the vibration, so that the sound pressure level can be prevented from having a high peak, and the uncomfortable feeling and annoyance can be reduced.

Although the following cases are contradictory to the above cases, in the case where the operating noise has a high sound pressure level but is in such a frequency range that the occupant does not easily have an uncomfortable feeling or feel annoyance, it is desirable that the left and right parking brake mechanisms 1L and 1R be actuated simultaneously, and in the case where the operating noise has such a low sound pressure level that the operating noise is not perceivable when caused by an operation of one parking brake mechanism 1L (1L) alone, but is perceivable when caused by operations of both the left and right parking brake mechanisms 1L and 1R, it is desirable that the left and right parking brake mechanisms 1L and 1R be actuated in succession. In actuality, it is preferable that sensory testing is conducted at the time of the design of the vehicle while respective timings at which the actuation commands for the parking brake mechanisms 1L and 1R are generated are varied, and that timings which cause the least uncomfortable feeling and annoyance are adopted.

In response to input of a parking brake actuation request from a driver of the vehicle, the parking brake actuation determiner 12 may input a parking brake actuation command into each of the left and right parking brake mechanisms 1L and 1R on the basis of a set timing to reduce the uncomfortable feeling caused to the occupant of the vehicle, thereby to cause the vehicle to enter into a parking lock state in which the vehicle is held stationary. As the above timing, for example, a timing which has been found to cause the least uncomfortable feeling and annoyance as a result of a test, a simulation, or the like, is set.

The parking brake actuation determiner 12 may include:
- an operation completion signal monitor 16 configured to input a parking brake actuation command into one 1L (1R) of the left and right parking brake mechanisms 1L and 1R, and perform monitoring for an operation completion signal indicating a completion of an operation of the one 1L (1R) of the left and right parking brake mechanisms 1L and 1R; and
- an actuation command sequential input section 17 configured to input a parking brake actuation command into the other 1R (1L) of the left and right parking brake mechanisms 1R and 1L in response to a detection of the operation completion signal by the operation completion signal monitor 16.

In this case, after the parking brake actuation determiner 12 inputs the parking brake actuation command into the one 1L (1R) of the parking brake mechanisms 1L and 1R, the operation completion signal monitor 16 waits for a receipt of the operation completion signal. Upon receipt of the operation completion signal, the actuation command sequential input section 17 inputs the parking brake actuation command into the other parking brake mechanism 1R (1L). The left and right parking brake mechanisms 1L and 1R may thus be actuated one after the other in succession to prevent the sound pressure level from having a high peak, so that the uncomfortable feeling and annoyance can be reduced.

The parking brake actuation determiner 12 may actuate the left and right parking brake mechanisms 1L and 1R simultaneously in accordance with the timings. In the case where the sound pressure level of the operating noise is low, or in the case where the effect of shielding the operating noise and/or the effect of suppressing vibration that contributes to the operating noise can be expected from the structure of the vehicle, for example, the left and right parking brake mechanisms 1L and 1R may be actuated simultaneously to shorten the durations of the operating noise and the vibration, so that the uncomfortable feeling and annoyance caused to the occupant of the vehicle can be reduced.

The parking brake actuation determiner 12 may include:
- a set time observer 14 configured to input a parking brake actuation command into one 1L (1R) of the left and right parking brake mechanisms 1L and 1R, and determine whether a set time has elapsed; and
- an actuation command suspending section 15 configured to input a parking brake actuation command into the other 1R (1L) of the left and right parking brake mechanisms 1L and 1R when the set time observer 14 has determined that the set time has elapsed.

The set time is determined, for example, at the time of the design of the vehicle on the basis of a sensory evaluation or the like.

In this case, after the parking brake actuation determiner 12 inputs the parking brake actuation command into the one 1L (1R) of the parking brake mechanisms 1L and 1R, the set time observer 14 determines whether the set time has elapsed. If it is determined that the set time has elapsed, the actuation command suspending section 15 inputs the parking brake actuation command into the other parking brake mechanism 1R (1L). The left and right parking brake mechanisms 1L and 1R may thus be actuated one after the other in succession to prevent the sound pressure level from having a high peak, so that the uncomfortable feeling and annoyance can be reduced.

The parking brake actuation determiner 12 may adjust both the timing at which each of the left and right parking brake mechanisms 1L and 1R is actuated and a timing at which a predetermined or pre-selected mechanism in the vehicle that generates operating noise is actuated so as to reduce the uncomfortable feeling caused to the occupant of the vehicle. An example of the predetermined mechanism is a door lock mechanism.

In the case where the predetermined mechanism is the door lock mechanism, for example, from the viewpoint of determining the timing at which each of the left and right parking brake mechanisms is actuated so as to reduce the uncomfortable feeling and annoyance, any operating noise generated at the door lock mechanism of the vehicle is taken into consideration when actuating the parking brake mechanisms. In the case where the parking brake mechanisms are actuated when an occupant is in the vehicle, a released door lock mechanism will be convenient for the occupant. Accordingly, in the case where the door lock mechanism is configured to be released upon actuation of the parking brake, operating noise is caused by the release of the door lock mechanism as well. Then, the timing at which the door lock mechanism is actuated and the timing at which each of the parking brake mechanisms 1L and 1R is actuated may be adjusted (for example, the parking brake may be actuated at substantially the same time as the door lock mechanism is actuated) to reduce the uncomfortable feeling and annoyance caused by the actuation of the parking brake.

Preferably, the brake device of the present invention includes left and right electric brake mechanisms 101L and 101R configured to be capable of independently applying braking forces to the left and right wheels 5 and 5, respectively, of the vehicle, and to be operated by a driver through a brake operation portion 104, each of the left and right parking brake mechanisms 102L and 102R is capable of independently switching between a parking lock state, in which the parking brake mechanism 102L or 102R prevents the braking force by a corresponding one of the left and right electric brake mechanisms 101L and 101R from being released, and an unlocked state, in which the parking brake mechanism 102L or 102R permits the braking force to be released, the control device 103 controls the left and right electric brake mechanisms 101L and 101R and the left and right parking brake mechanisms 102L and 102R, and the parking brake actuation determiner 119 adjusts respective timings at which the left and right parking brake mechanisms 102L and 102R are actuated to shift from the unlocked state to the parking lock state so as to reduce the uncomfortable feeling caused to the occupant of the vehicle.

As described above, in order to reduce the uncomfortable feeling or annoyance caused by operating noises of parking brakes, measures having various and composite approaches can overall achieve an increase in quietness. The present applicant has found that reductions in the uncomfortable feeling and annoyance can be achieved by a measure related to control, such as optimizing timings at which actuation commands are generated, as well as by reducing the sound pressure level of the operating noise by a mechanical approach, or by using the electronic sound to reduce the uncomfortable feeling and annoyance, as described above.

In the case where the brake device has independent left and right parking brake mechanisms, respective timings at which the left and right parking brake mechanisms are actuated can also be determined independently. Thus, with a focus on the "operating noise" that is most likely to cause the uncomfortable feeling or annoyance of all operating noises that occur when the parking brakes are actuated, timings at which the actuation commands are generated may be controlled to manage timings at which operating noises are generated, for example, thereby to reduce the uncomfortable feeling and annoyance caused to the driver or the like by the operating noises. Thus, reductions in the uncomfortable feeling and annoyance caused by the operating noises of the parking brakes can be achieved.

According to the above structure, in the case of normal braking, where a so-called service brake operation is performed, if the driver operates the brake operation portion 104, the control device 103 controls the left and right electric brake mechanisms 101L and 101R to independently apply braking forces to the left and right wheels 5 and 5, respectively. In the case where the parking brake mechanisms 102L and 102R are actuated, the driver operates, for example, a parking brake request switch 21 or the like when the vehicle is stationary with use of the electric brake mechanisms 101L and 101R or the like. As a result, the control device 103 switches the state of each of the left and right parking brake mechanisms 102L and 102R from the unlocked state to the parking lock state. At this time, the parking brake actuation determiner 119 of the control device 103 adjusts the timing at which each of the left and right parking brake mechanisms 102L and 102R is actuated to shift the state of the parking brake mechanism 102L or 102R from the unlocked state to the parking lock state. For example, a process of reconfiguring a control flow of the control device 103 or the like can be performed to reduce the uncomfortable feeling and annoyance due to the operating noise, which does not restrict the structure or arrangement of the electric motor or a speed reduction mechanism as in related art. This leads to the improvement in versatility of the electric brake device.

Timings at which the operating noises are generated and which reduce the uncomfortable feeling and annoyance are previously set at the time of design of the vehicle on the basis of the sound pressure level and frequency distribution of each operating noise, the arrangement of the parking brake mechanisms 102L and 102R, the method of fitting the parking brake mechanisms 102L and 102R, the transmission path of each operating noise to the vehicle, resonance, and chattering.

For example, when the sound pressure level of the operating noise is low, simultaneous actuation of the left and right parking brake mechanisms 102L and 102R does not lead to a high sound pressure level, and shortening the duration of the operating noise leads to reductions in the uncomfortable feeling and annoyance. Meanwhile, in the case where the effect of shielding the operating noise and/or the effect of suppressing the vibration that contributes to the operating noise can be expected from the structure of the vehicle, increases in the operating noise and the amplitude of the vibration would not lead to a high sound pressure level perceived by the occupant of the vehicle. Then, similarly to the above-described example, the left and right parking brake mechanisms 102L and 102R may be actuated simultaneously to shorten the durations of the operating noise and the vibration thereby to reduce the uncomfortable feeling and annoyance.

Here, the duration of the operating noise refers to a period during which the operating noise is perceived by the occupant, and a duration in the case where the left and right parking brake mechanisms 102L and 102R are actuated simultaneously is equal to a duration of a normal operation, and a duration in the case where one parking brake mechanism 102L (102R) is actuated first, and the other parking brake mechanism 102R (102L) is actuated immediately after the operation of the one parking brake mechanism 102L (102R) is completed so as to operate consecutively, is twice the duration of the normal operation.

In contrast to the above examples, when the sound pressure level of the operating noise is high, the left and right parking brake mechanisms 102L and 102R may be actuated one after the other in succession, at different timings, to prevent the sound pressure level from having a high peak, so that the uncomfortable feeling and annoyance can be reduced. Further, in the case where the effect of shielding the operating noise and/or the effect of suppressing the vibration that contributes to the operating noise cannot be expected from the structure of the vehicle, more specifically, in the case where air-borne noise tends to easily occur or where resonance or chattering noise (beat noise) tends to easily occur, the left and right parking brake mechanisms 102L and 102R may be actuated one after the other in succession to reduce the operating noise and the amplitude of the vibration, so that the sound pressure level can be prevented from having a high peak, and the uncomfortable feeling and annoyance can be reduced.

In the case where the operating noise has a high sound pressure level but is in such a frequency range that the occupant does not easily have an uncomfortable feeling or feel annoyance, it is desirable that the left and right parking brake mechanisms 102L and 102R be actuated simultaneously. Further, in the case where the operating noise has such a low sound pressure level that the operating noise is not perceivable when caused by an operation of one parking brake mechanism 102L (102R) alone, but is perceivable when caused by operations of both the left and right parking brake mechanisms 102L and 102R, it is desirable that the left and right parking brake mechanisms 102L and 102R be actuated in succession. In actuality, it is preferable that sensory testing is conducted at the time of the design of the vehicle while respective timings at which the actuation commands for the parking brake mechanisms 102L and 102R are generated are varied, and that timings which cause the least uncomfortable feeling and annoyance are adopted.

Each electric brake mechanism 101L or 101R may include an electric motor 106, a brake rotor 109, a friction pad 110 caused to make contact with the brake rotor 109 to generate the braking force, a speed reduction mechanism 107 configured to reduce a speed of rotation of the electric motor 106, and a linear motion mechanism 108 configured to convert a rotational motion outputted from the speed reduction mechanism 107 into a linear motion of the friction pad 110, and each parking brake mechanism 102L or 102R may include:
- a locking member 116 to be engaged with an engagement hole 118 defined in the speed reduction mechanism 107; and
- an actuator 117 configured to drive the locking member 116 so as to switch between the parking lock state, in which the locking member 116 is engaged with the engagement hole 118 to restrict the rotational motion of the speed reduction mechanism 107, and the unlocked state, in which the locking member 116 is out of engagement with the engagement hole 118.

In this case, example causes of the operating noise include an operating noise that is generated when the actuator 117 is actuated to switch from the unlocked state to the parking lock state, a gear rattle of gears of the speed reduction mechanism 107, and a noise that is generated when the locking member 116 is fitted into and engaged with the engagement hole 118. Regardless of the cause of the operating noise, the parking brake actuation determiner 119 is able to reduce the uncomfortable feeling and annoyance caused by the operating noise by adjusting the timing at which each of the parking brake mechanisms 102L and 102R is actuated in accordance with the cause of the operating noise.

The control device 103 may include left and right brake pressure generators 120L and 120R configured to output brake pressure commands to the left and right electric brake mechanisms 101L and 101R, respectively, to cause the left and right electric brake mechanisms 101L and 101R to generate a set pressing force, in response to input of a brake pressure request signal from the parking brake actuation determiner 119. The set pressing force is determined, for example, from a braking force necessary to keep the vehicle at stoppage, as a result of a test, a simulation, or the like. According to this structure, the left and right parking brake mechanisms 102L and 102R can be actuated after each of the left and right brake pressure generators 120L and 120R outputs the brake pressure command to generate the set pressing force.

The parking brake actuation determiner 119 may generate the brake pressure request signal for each of the left and right brake pressure generators 120L and 120R on the basis of the set timing, in response to input of a parking brake actuation request.

In this case, in response to the parking brake actuation request from a parking brake request switch 121 or the like, the parking brake actuation determiner 119 generates the brake pressure request signal for one 120L (120R) of the left and right brake pressure generators 120L and 120R, for example. Thereafter, the parking brake actuation determiner 119 generates the brake pressure request signal for the other brake pressure generator 120R (120L) on the basis of the set timing. Note that the parking brake actuation determiner 119 may generate the brake pressure request signals for the left and right brake pressure generators 120L and 120R simultaneously.

The parking brake actuation determiner 119 may monitor a feedback value of a pressing force generated by each electric brake mechanism 101L or 101R after outputting the brake pressure request signal for each of the left and right brake pressure generators 120L and 120R, and, when the pressing force has exceeded a threshold value, generate a parking brake actuation command for each of the left and right parking brake mechanisms 102L and 102R on the basis of the set timing to cause each of the left and right parking brake mechanisms 102L and 102R to enter into the parking lock state. The threshold value is determined, for example, on the basis of a result of an experiment, a simulation, or the like.

The pressing force of each of the electric brake mechanisms 101L and 101R should have reached a pressing force necessary to keep the vehicle at stoppage when the parking brake mechanisms 102L and 102R are actuated. Accordingly, the parking brake actuation determiner 119 monitors the feedback value of the pressing force generated by each of the electric brake mechanisms 101L and 101R after outputting the brake pressure request signal for each of the left and right brake pressure generators 120L and 120R. If the feedback value of at least one of the pressing forces of the electric brake mechanisms 101L and 101R is equal to or less than the threshold value, the process of monitoring the feedback value of the pressing force of each of the electric brake mechanisms 101L and 101R is repeated, for example. If both the feedback values have exceeded the threshold value, the parking brake actuation determiner 119 generates the respective parking brake actuation command for each of the parking brake mechanisms 102L and 102R on the basis of the set timing. This makes sure that the vehicle stops while reducing the uncomfortable feeling and annoyance caused by the operating noise.

After outputting the brake pressure request signal for each of the left and right brake pressure generators 120L and 120R, the parking brake actuation determiner 119 may generate a parking brake actuation command for each of the left and right parking brake mechanisms 102L and 102R to cause each of the left and right parking brake mechanisms 102L and 102R to enter into the parking lock state, in accordance with a predetermined condition; and the parking brake actuation determiner 119 may output the respective brake pressure request signals for the left and right brake pressure generators 120L and 120R and the respective parking brake actuation commands for the left and right parking brake mechanisms 102L and 102R on the basis of set timings.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
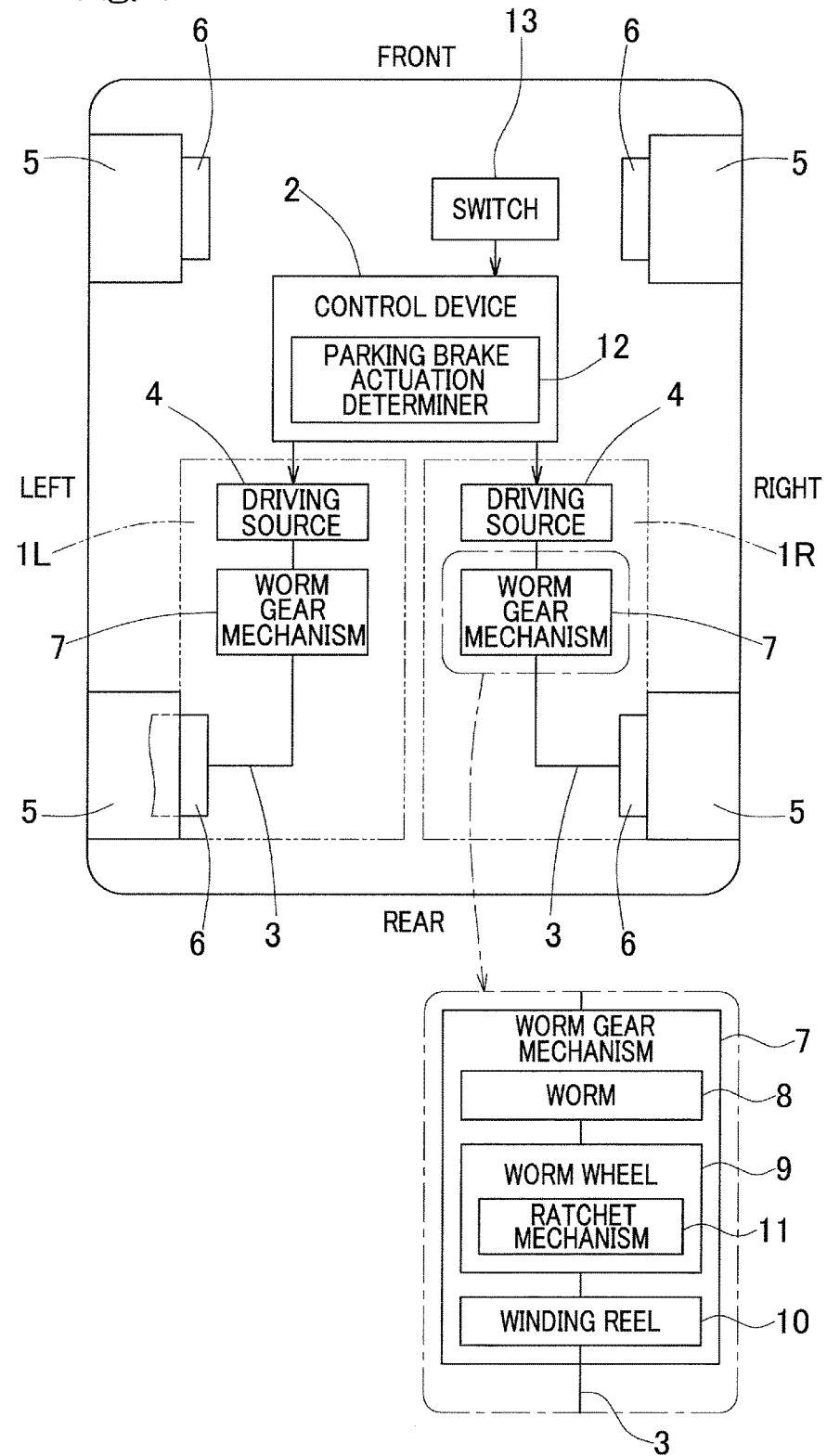
FIG. 1 is a block diagram illustrating the schematic configuration of a main part of a vehicle on which a brake device according to a first embodiment of the present invention is installed, in a plan view.

A brake device according to a first embodiment of the present invention will be described with reference to FIGS. 1 to 4. As illustrated in FIG. 1, this brake device includes left and right parking brake mechanisms 1L and 1R, and a control device 2 for controlling these parking brake mechanisms 1L and 1R. The left and right parking brake mechanisms 1L and 1R have, for example, a configuration in which wires 3 and 3 of so-called wire-type parking brakes are pulled by driving sources 4 and 4, such as electric motors or actuators, prepared separately for the left and right sides. Note that the left and right parking brake mechanisms 1L and 1R are not limited to such mechanisms. On a vehicle on which this brake device is installed, hydraulic or electric brake devices, for example, are provided as service brakes 6 for braking left front, right front, left rear, and right rear wheels 5.

In this embodiment, the left and right parking brake mechanisms 1L and 1R are provided for the left and right rear wheels 5 and 5. Note that the left and right parking brake mechanisms 1L and 1R may alternatively be provided for the left and right front wheels 5 and 5, or the left and right parking brake mechanisms 1L and 1R may alternatively be provided for the left and right wheels 5 and 5 on both front and rear sides. The parking brake mechanisms 1L and 1R are configured to independently apply braking forces to the left and right wheels 5 and 5, respectively, of the vehicle, and hold the vehicle stationary or at stoppage. As described below, each of the parking brake mechanisms 1L and 1R uses, for example, a brake rotor (not shown) and a friction pad (not shown) of the service brake 6, to apply the braking force.

Each of the parking brake mechanisms 1L and 1R includes the driving source 4, a worm gear mechanism 7, the wire 3, and a brake shoe lever or a push rod/cam mechanism, which is not shown. In the case where a drum brake is adopted as each service brake 6, the brake shoe lever is adopted. In the case where a disc brake is adopted as each service brake 6, the push rod/cam mechanism is adopted. The push rod/cam mechanism includes a cam (not shown) connected to the wire 3, a push rod (not shown) pressed by a pressing force by this cam, and a piston (not shown) which increases the pressure of a pressing force from the push rod and transmits the increased pressure to the friction pad.

As shown in an illustration enclosed by a single-dotted line, the worm gear mechanism 7 includes a worm 8 on the driving side, a worm wheel 9 on the driven side, and a winding reel 10. The worm 8 is coupled to a motor shaft (not shown) of the electric motor, which is the driving source 4. The worm wheel 9 meshes with the worm 8, and a rotation of the worm wheel 9 causes the winding reel 10 to rotate. This rotation of the winding reel 10 causes the wire 3 to be wound up. Driving the electric motor to rotate in a predetermined rotation direction causes the wire 3 to be wound up through the worm 8, the worm wheel 9, and the winding reel 10.

In the case where the drum brake is adopted as each service brake 6, winding up of the wire 3 pulls the brake shoe lever connected to the wire 3, so that the friction pad is pressed against the brake rotor to cause a parking brake to function. In the case where the disc brake is adopted as each service brake 6, winding up of the wire 3 causes the cam connected to the wire 3 to press the push rod, so that the piston presses the friction pad. As a result, the friction pad is pressed against the brake rotor, so that the parking brake functions.

The worm wheel 9 is provided with a ratchet mechanism 11 to prevent the worm wheel 9 from rotating in a reverse direction even if the electric motor stops running or electricity stops passing through the electric motor. For example, if each of the parking brake mechanisms 1L and 1R is actuated to generate a braking force, the ratchet mechanism 11 prevents the braking force from being released even after main power of the vehicle is turned off. The vehicle is thus held stationary.

Figure 2:
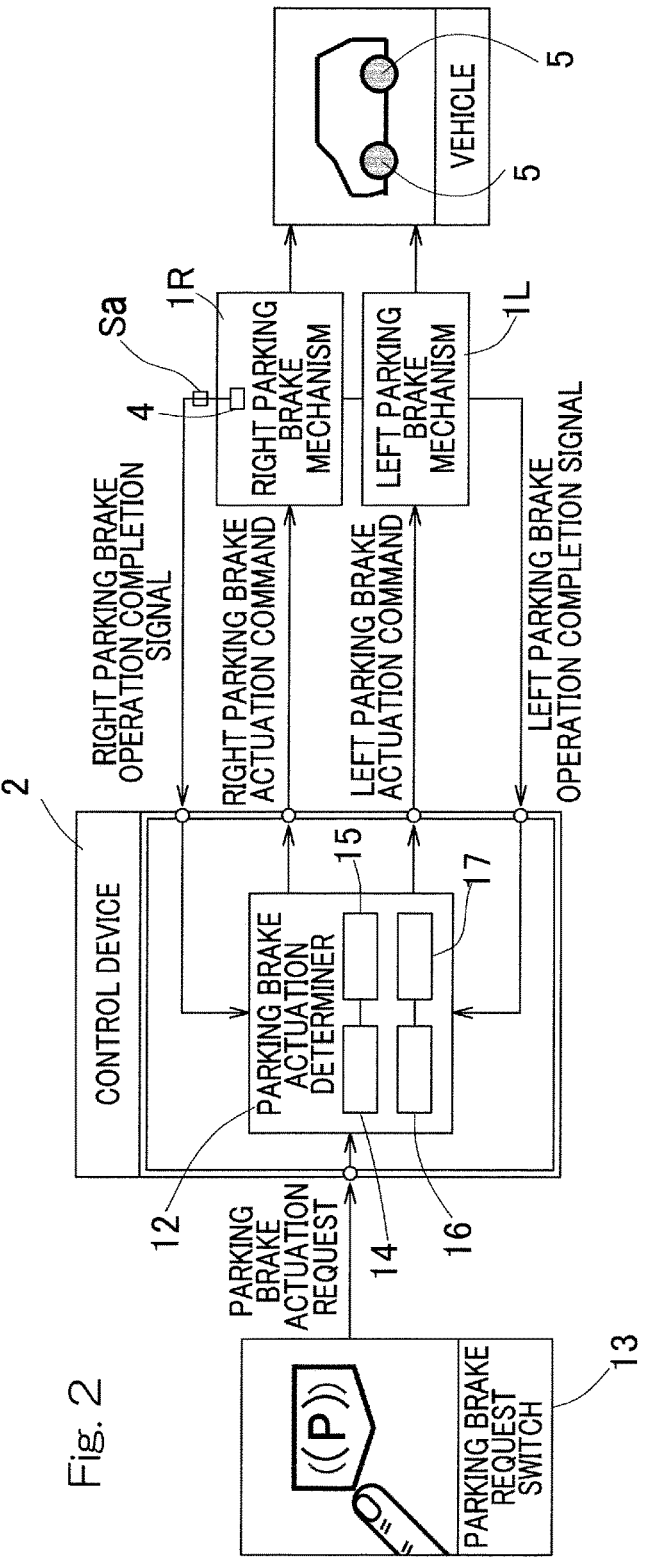
FIG. 2 is a block diagram of a control system of the brake device.

FIG. 2 is a block diagram of a control system of this brake device. The control device 2 of this brake device includes a parking brake actuation determiner 12. The control device 2 is formed by a computer including a processor, a read-only memory (ROM) having a program to be executed by the processor, a random-access memory (RAM), and another electronic circuit, such as a co-processor. The parking brake actuation determiner 12 adjusts respective timings at which the left and right parking brake mechanisms 1L and 1R are actuated respectively to shift from an unlocked state to a parking lock state so as to reduce an uncomfortable feeling and annoyance caused to an occupant of the vehicle.

When a driver desires to actuate the parking brake mechanisms 1L and 1R, the driver operates a parking brake request switch 13 provided on a console panel or the like of the vehicle, for example. A parking brake actuation request generated as a result is inputted to the parking brake actuation determiner 12. In the case where the left and right parking brake mechanisms 1L and 1R are actuated simultaneously, the parking brake actuation determiner 12 generates (left and right) parking brake actuation commands simultaneously for the left and right parking brake mechanisms 1L and 1R upon input of the parking brake actuation request, for example.

The case where the left and right parking brake mechanisms 1L and 1R are actuated one after the other in succession, without use of a parking brake operation completion signal, will now be described below. In this case, the parking brake actuation determiner 12 includes a set time observer 14 and an actuation command suspending section 15. The set time observer 14 inputs the parking brake actuation command into one 1L (1R) of the left and right parking brake mechanisms 1L and 1R, and determines whether a set time has elapsed. The set time observer 14 includes a timer implemented in software or hardware, and a comparator that compares an output value of the timer with the set time, and outputs a result of the comparison.

The set time is, for example, determined previously by a sensory evaluation or the like at the time of the design of the vehicle, and the simplest example thereof is a time from the generation of the parking brake actuation command for the one parking brake mechanism 1L (1R) to a completion of an operation of the one parking brake mechanism 1L (1R). The actuation command suspending section 15 includes a demultiplexer or the like implemented in software or hardware, for example, and, when the set time observer 14 has determined that the set time has elapsed, outputs the parking brake actuation command from the demultiplexer to input the parking brake actuation command into the other 1R (1L) of the left and right parking brake mechanisms 1L and 1R. The left and right parking brake mechanisms 1L and 1R are thus actuated one after the other in succession using the set time.

Figure 3:
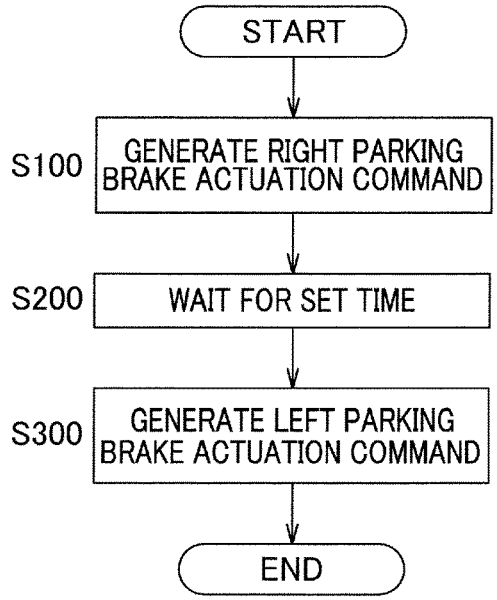
FIG. 3 is a flowchart illustrating an example in which left and right parking brake mechanisms in the brake device are actuated one after the other in time.

FIG. 3 is a flowchart illustrating an example in which the left and right parking brake mechanisms in this brake device are actuated one after the other in time. The following description will be provided with appropriate reference made to FIGS. 1 and 2 as well. The present control flow is started if the parking brake request switch 13 is pressed, and the parking brake actuation request is transmitted to the parking brake actuation determiner 12 (START). Note that, in the example described below, descriptions of a determination as to malfunctioning of the parking brake, a process related to a time limit at a waiting time for condition meeting, and so on, are omitted, and it is assumed that such determination and process are appropriately performed as necessary. For the sake of description, it is assumed in the following description that the right parking brake mechanism 1R is actuated before the left parking brake mechanism 1L in the case where the left and right parking brake mechanisms 1L and 1R are actuated one after the other in succession, but it is to be noted that either one of the left and right parking brake mechanisms 1L and 1R may be actuated first.

After the present procedure is started, upon input of the parking brake actuation request, the parking brake actuation determiner 12 generates the parking brake actuation command first for the right parking brake mechanism 1R to actuate the right parking brake mechanism 1R (step S100). Thereafter, the parking brake actuation determiner 12 waits for the set time of a given length set by the set time observer 14 (step S200). After the time of the given length has elapsed, that is, when the set time observer 14 has determined that the set time has elapsed, the actuation command suspending section 15 of the parking brake actuation determiner 12 generates the parking brake actuation command for the left parking brake mechanism 1L to actuate the left parking brake mechanism 1L (step S300). The present procedure is thereafter finished (END).

The case where the left and right parking brake mechanisms 1L and 1R are actuated one after the other in succession, with use of the parking brake operation completion signal, will now be described below. As illustrated in FIG. 2, the parking brake actuation determiner 12 in this case includes an operation completion signal monitor 16 and an actuation command sequential input section 17. The operation completion signal monitor 16 inputs the parking brake actuation command into one mechanism 1L (1R) of the left and right parking brake mechanisms 1L and 1R, and performs monitoring for an operation completion signal indicating a completion of the operation of the one mechanism 1L (1R) of the left and right parking brake mechanisms 1L and 1R.

A specific example of a timing at which the operation completion signal for the parking brake mechanism 1L (1R) is outputted is a timing based on the fact that the driving source 4, such as the aforementioned electric motor or actuator, has completed a required amount of operation. For example, an electric current sensor Sa that detects an electric current in the driving source 4 is provided, and then, the operation completion signal monitor 16 is able to determine that the driving source 4 has completed the required amount of operation by using a predetermined comparison function, a transform function, and/or the like in a library or a lookup table (LUT), for example, and, when the electric current detected by the electric current sensor Sa is equal to or greater than a threshold value, by calculating and outputting a result of comparison between the value of the electric current and the threshold value. The threshold value is determined, for example, on the basis of a result of an experiment, a simulation, or the like. In addition, considering that the aforementioned required amount corresponds to the angle of rotation of the driving source 4 for the parking brake, the above timing may be based on the fact that the driving source 4 has rotated by a minimum necessary angle determined as a result of an experiment, a simulation, or the like, with reference made to an angle measured by a rotation angle sensor attached to the winding reel or the like or by an angle sensor used on controlling the motor served as the driving source 4, for example.

If the operation completion signal monitor 16 detects the operation completion signal, the actuation command sequential input section 17 inputs the parking brake actuation command into the other 1R (1L) of the left and right parking brake mechanisms 1L and 1R to actuate the other parking brake mechanism 1R (1L). The left and right parking brake mechanisms 1L and 1R are thus actuated one after the other in succession using the parking brake operation completion signal.

Figure 4:
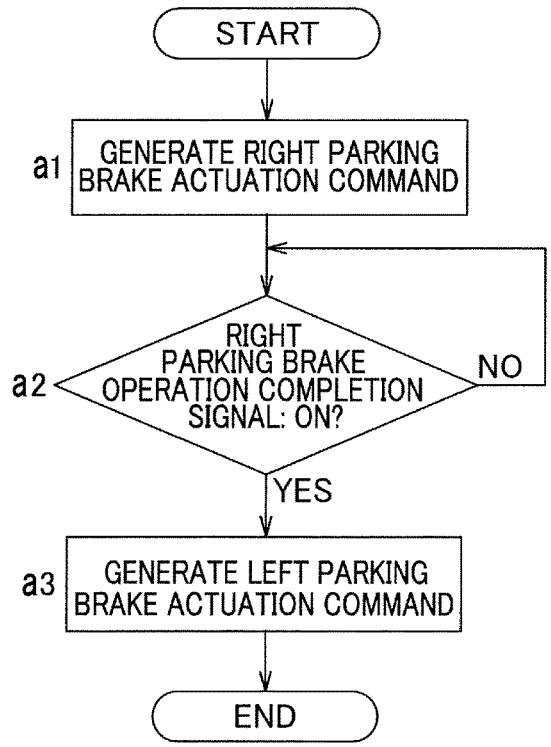
FIG. 4 is a flowchart illustrating an example in which a parking brake operation completion signal is used in the brake device.

FIG. 4 is a flowchart illustrating an example in which the parking brake operation completion signal is used in this brake device. The present procedure is started if the parking brake request switch 13 is pressed and the parking brake actuation request is transmitted to the parking brake actuation determiner 12 (START). Upon input of the parking brake actuation request, the parking brake actuation determiner 12 generates the parking brake actuation command first for the right parking brake mechanism 1R, also for the sake of description, to actuate the right parking brake mechanism 1R (step a1).

Next, the operation completion signal monitor 16 waits until the parking brake operation completion signal is received from the right parking brake mechanism 1R (step a2). If the parking brake operation completion signal is not received (step a2: no), the procedure goes back to step a2. After receiving the parking brake operation completion signal from the right parking brake mechanism 1R (step a2: yes), the actuation command sequential input section 17 generates the parking brake actuation command for the left parking brake mechanism 1L to actuate the left parking brake mechanism 1L (step a3). The present procedure is thereafter finished (END).

According to the brake device described above, the control device 2 switches the state of each of the left and right parking brake mechanisms 1L and 1R from the unlocked state to the parking lock state in response to pressing of the parking brake request switch 13. At this time, the parking brake actuation determiner 12 of the control device 2 adjusts the timing at which each of the left and right parking brake mechanisms 1L and 1R is actuated. For example, such a process of reconfiguring the control flow of the control device 2 may be performed to reduce the uncomfortable feeling and annoyance due to the operating noise, which does not restrict the structure or arrangement of components as in related art. This leads to an improvement in versatility of the brake device.

The uncomfortable feeling and annoyance due to the operating noise can be reduced by estimating, for example, the sound pressure level of the operating noise at the time of the design of the vehicle, and by actuating the left and right parking brake mechanisms 1L and 1R simultaneously or one after the other in succession in accordance with the operating noise. For example, when the sound pressure level of the operating noise is low, simultaneous actuation of the left and right parking brake mechanisms 1L and 1R does not lead to a high sound pressure level, and leads to shortening the duration of the operating noise, resulting in reductions in the uncomfortable feeling and annoyance.

Meanwhile, in the case where an effect of shielding the operating noise and/or an effect of suppressing vibration that contributes to the operating noise can be expected from the structure of the vehicle, increases in the operating noise and the amplitude of the vibration would not lead to a high sound pressure level perceived by the occupant of the vehicle. As such, similarly to the above-described example, the left and right parking brake mechanisms 1L and 1R may be actuated simultaneously to shorten the durations of the operating noise and the vibration thereby to reduce the uncomfortable feeling and annoyance.

When the sound pressure level of the operating noise is high, the left and right parking brake mechanisms 1L and 1R may be actuated one after the other in succession to prevent the sound pressure level from having a high peak, so that the uncomfortable feeling and annoyance can be reduced. Further, in the case where the effect of shielding the operating noise and/or the effect of suppressing the vibration that contributes to the operating noise cannot be expected from the structure of the vehicle, more specifically, in the case where air-borne noise tends to easily occur or where resonance or chattering noise tends to easily occur, the left and right parking brake mechanisms 1L and 1R may be actuated one after the other in succession to reduce the operating noise and the amplitude of the vibration, so that the sound pressure level can be prevented from having a high peak, and the uncomfortable feeling and annoyance can be reduced.

A second embodiment will now be described below. In the following description, components or features that have their equivalents in the preceding embodiment described above will be denoted by the same reference numerals as those of their equivalents, and redundant description will be omitted. When only a part of such a component or feature is described, the remaining part of the component or feature should be understood to remain the same as in the preceding embodiment unless otherwise noted. Like components or features produce like advantageous effects.

Figure 5:
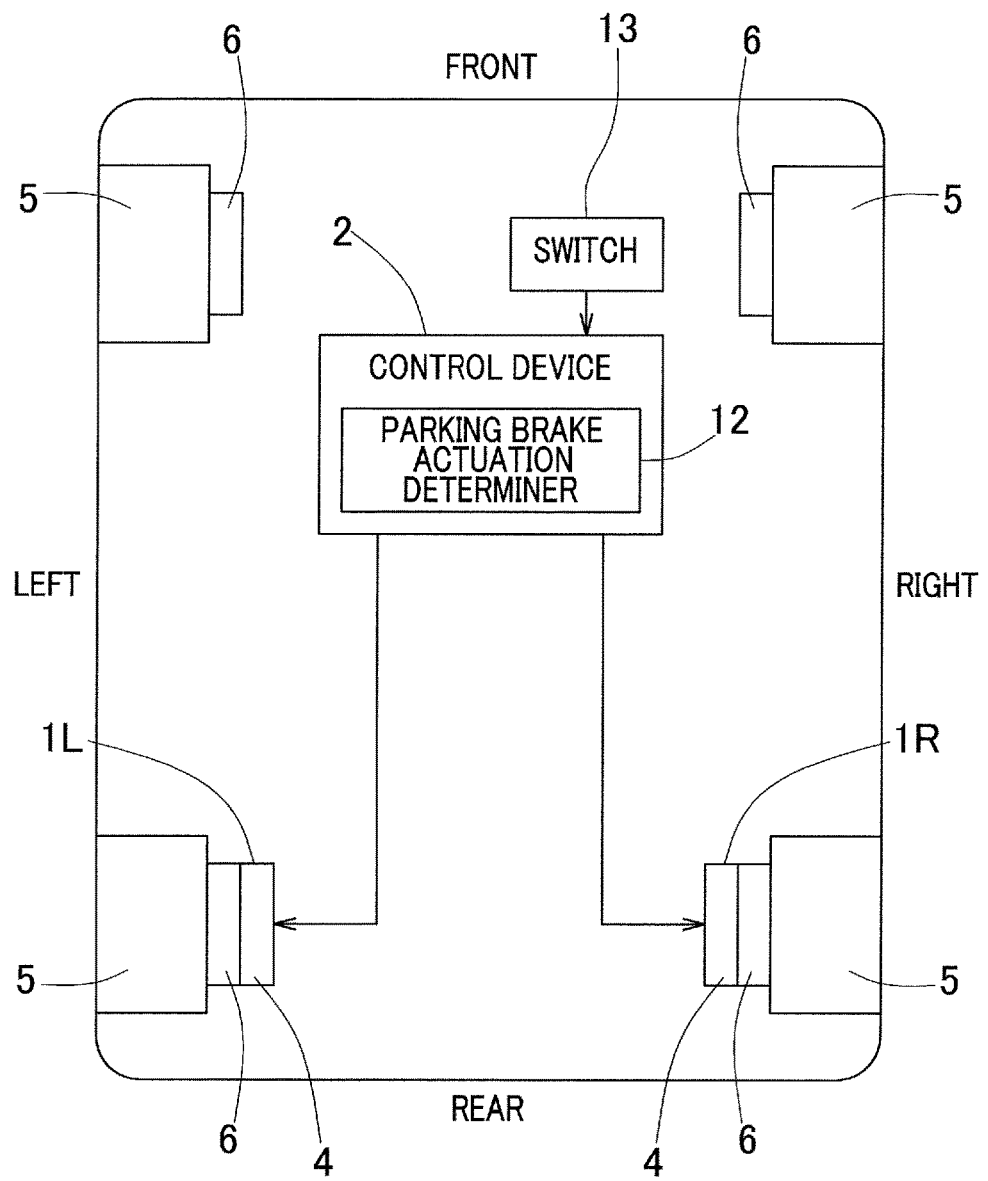
FIG. 5 is a block diagram illustrating the schematic configuration of a main part of a vehicle on which a brake device according to a second embodiment of the present invention is installed, in a plan view.

As illustrated in FIG. 5, left and right parking brake mechanisms 1L and 1R, each of which is formed by a driving source 4, such as an electric motor, may be provided directly on left and right service brakes 6 and 6, respectively. In this case, a brake device as a whole can be made compact, and the assemblability of this brake device to a vehicle is enhanced in comparison with the brake device according to the first embodiment. A direct-acting actuator or electric motor, for example, may be used as the driving source 4 for each of the parking brake mechanisms 1L and 1R, and the brake shoe lever or the cam may be directly driven without use of the worm gear mechanism and the wire.

In each of the above-described embodiments, the parking brake actuation determiner 12 may be configured to adjust both the timing at which each of the left and right parking brake mechanisms 1L and 1R is actuated and a timing at which a predetermined mechanism in the vehicle is actuated so as to reduce the uncomfortable feeling caused to the occupant of the vehicle. An example of the predetermined mechanism is a door lock mechanism (not shown). In the case where the door lock mechanism is configured to be released upon actuation of the parking brake, operating noise is caused by the release of the door lock mechanism as well. Then, the timing at which the door lock mechanism is actuated and the timing at which each of the parking brake mechanisms 1L and 1R is actuated may be adjusted to reduce the uncomfortable feeling and annoyance caused by the actuation of the parking brake.

Figure 6:
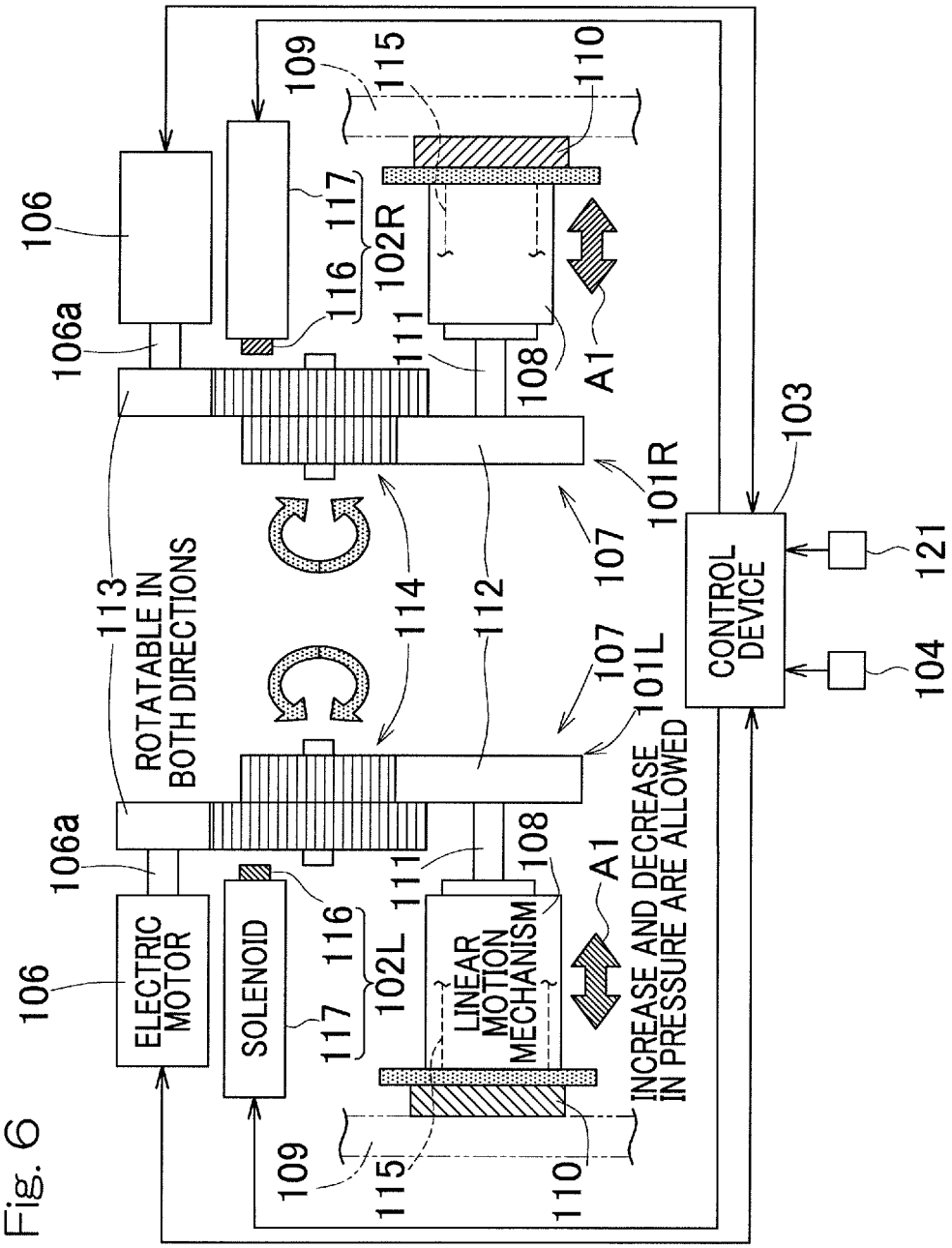
FIG. 6 is a schematic diagram illustrating a brake device according to a third embodiment of the present invention.

An electric brake device according to a third embodiment of the present invention will now be described below with reference to FIGS. 6 to 14. As illustrated in FIG. 6, this electric brake device includes left and right electric brake mechanisms 101L and 101R, left and right parking brake mechanisms 102L and 102R, and a control device (hereinafter referred to also as an "electric brake and parking brake control device") 103 that controls the electric brake mechanisms 101L and 101R and the parking brake mechanisms 102L and 102R.

The left and right electric brake mechanisms 101L and 101R independently apply braking forces to left and right wheels 5 and 5 (see FIG. 9) of a vehicle, respectively in response to an operation of a brake pedal 104, which is a brake operation portion 104. Note that the brake operation portion 104 is not limited to a pedal, but may alternatively be a button, a lever, or the like, as long as it is a means for an operator to give an instruction to apply a brake. The left and right electric brake mechanisms 101L and 101R are configured to be symmetrical or to have the same structure, and the left and right parking brake mechanisms 102L and 102R are also configured to be symmetrical or to have the same structure. Note that an alteration, modification or the like which is required to install them on the vehicle, for example, is permitted. The parking brake mechanisms 102L and 102R are fitted on the vehicle such that each one 102L (102R) of the parking brake mechanisms 102L and 102R is associated with corresponding one 101L (101R) of the electric brake mechanisms 101L and 101R. The left and right electric brake mechanisms 101L and 101R are provided for both the front and rear wheels, whereas the left and right parking brake mechanisms 102L and 102R are provided for either the rear wheels or the front wheels of the vehicle. Note that the left and right parking brake mechanisms 102L and 102R may alternatively be provided for both the front and rear wheels.

Each of the electric brake mechanisms 101L and 101R includes an electric motor 106, a speed reduction mechanism 107 for reducing the speed of rotation of the electric motor 106, a linear motion mechanism 108, a brake rotor 109, and a friction pad 110. The electric motor 106, the speed reduction mechanism 107, and the linear motion mechanism 108 are incorporated in a housing (not shown) or the like, for example.

The speed reduction mechanism 107 transmits the rotation of the electric motor 106 to a third gear 112 fixed to a rotating shaft 111 with reduced speed, and includes a first gear 113, an intermediate gear 114, and the third gear 112. The speed reduction mechanism 107 according to this embodiment is configured to be capable of transmitting rotation of the first gear 113 which is fitted to a rotor shaft 106a of the electric motor 106, to the third gear 112 which is fixed to an end portion of the rotating shaft 111, with reduced speed via the intermediate gear 114 which has a two-stage configuration having integrated two gears with different numbers of teeth.

The linear motion mechanism 108 converts a rotational motion outputted from the speed reduction mechanism 107 into a linear motion of a linearly moving portion 115, which is substantially cylindrical or columnar in shape, through a feed screw mechanism, to bring the friction pad 110 into or out of contact with the brake rotor 109. The linearly moving portion 115 is supported so as to be movable in an axial direction indicated by arrow A1 while being prevented from rotating. The friction pad 110 is disposed at an end of the linearly moving portion 115 on the outboard side (i.e., on the left or right side, with respect to the longitudinal center line, of the vehicle). As a result of the rotation of the electric motor 106 being transmitted to the linear motion mechanism 108 through the speed reduction mechanism 107, the rotational motion is converted into the linear motion, and the linear motion is converted into a pressing force for the friction pad 110 to cause a braking force.

The parking brake mechanism 102L (102R) is configured to be capable of switching between a parking lock state, in which the parking brake mechanism 102L (102R) prevents the braking force by the electric brake mechanism 101L (101R) from being released, and an unlocked state, in which the parking brake mechanism 102L (102R) permits the braking force to be released. The parking brake mechanism 102L (102R) includes a locking member 116 and an actuator 117 that drives the locking member 116 to switch the state thereof.

Figure 7A:
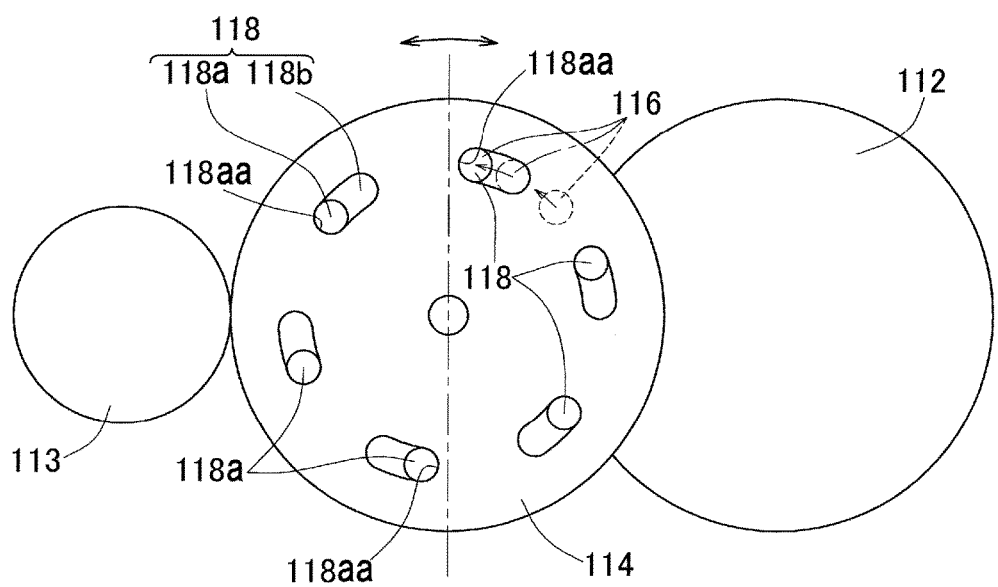
FIG. 7A is a schematic diagram illustrating a main part of a parking brake mechanism of the electric brake device in a plan view.
Figure 7B:
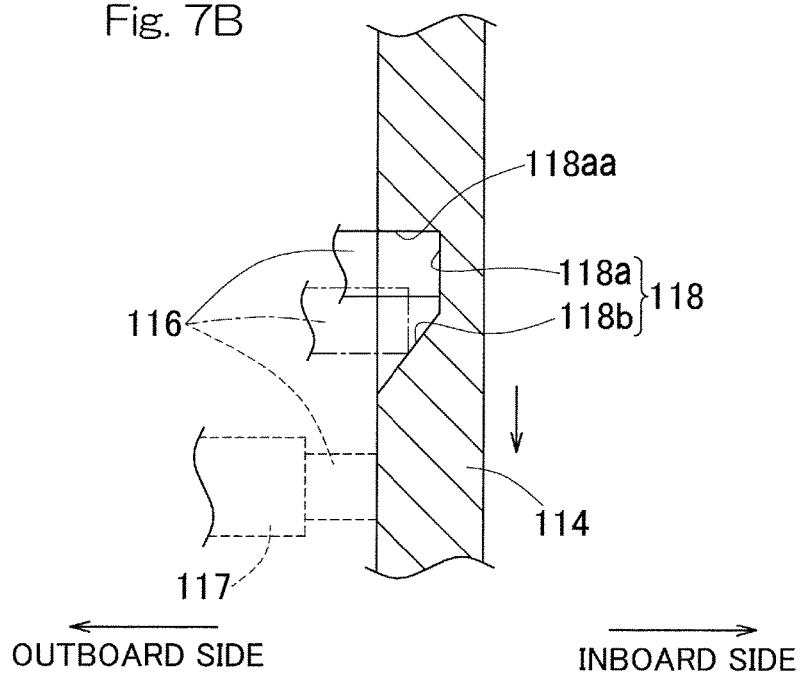
FIG. 7B is an enlarged sectional view illustrating a section of one of engagement holes illustrated in FIG. 7A taken along a radial direction.

FIG. 7A is a schematic diagram illustrating a main part of the parking brake mechanism in a plan view, and FIG. 7B is an enlarged sectional view illustrating a section of one of engagement holes 118 illustrated in FIG. 7A taken along a circumferential direction when viewed from the outboard side. As illustrated in FIG. 7A, in an outboard-side end surface of the intermediate gear 114, a plurality of (six, in this embodiment) engagement holes 118 are formed at regular intervals in the circumferential direction. Each engagement hole 118 is formed in the shape of an oblong hole elongated in the circumferential direction. As illustrated in FIG. 7B, the locking member 116 is configured to be engaged with one of the engagement holes 118. Each engagement hole 118 includes a bottomed cylindrical hole portion 118a having a flat bottom, and a slanting hole portion 118b joined to the bottomed cylindrical hole portion 118a. In section as FIG. 7B, the slanting hole portion 118b is shaped so as to slant to come closer to the outboard side thereof with increasing circumferential distance from a joint between the slanting hole portion 118b and the bottomed cylindrical hole portion 118a.

A linear solenoid, for example, is adopted as the actuator 117. The actuator 117 is configured to cause the locking member (a solenoid pin) 116 to advance out of the actuator 117 to be fitted into the bottomed cylindrical hole portion 118a of the engagement hole 118 formed in the intermediate gear 114 thereby to accomplish engagement of the locking member 116 with the engagement hole 118, so that rotation of the intermediate gear 114 is restrained, resulting in the parking lock state. A portion of the locking member 116 or the entire locking member 116 is caused to recede into the actuator 117 thereby to cause a disengagement thereof from the engagement hole 118, so that the rotation of the intermediate gear 114 is permitted, resulting in the unlocked state.

The parking brake mechanism causes the electric brake mechanism 101L (101R) (see FIG. 6) to generate a pressing force greater than a required pressing force derived from a braking force necessary to stop the vehicle, and then actuates the actuator 117 to cause the locking member 116 to advance out of the actuator 117 as described above. However, at this time, the locking member 116 may not always come into engagement with any one of the engagement holes 118 formed in the intermediate gear 114. But, even if the locking member 116 does not come into engagement with the bottomed cylindrical hole portion 118a of any engagement hole 118, the locking member 116 will be fitted into and engaged with one of the engagement holes 118 in a manner described below.

Figure 8A:
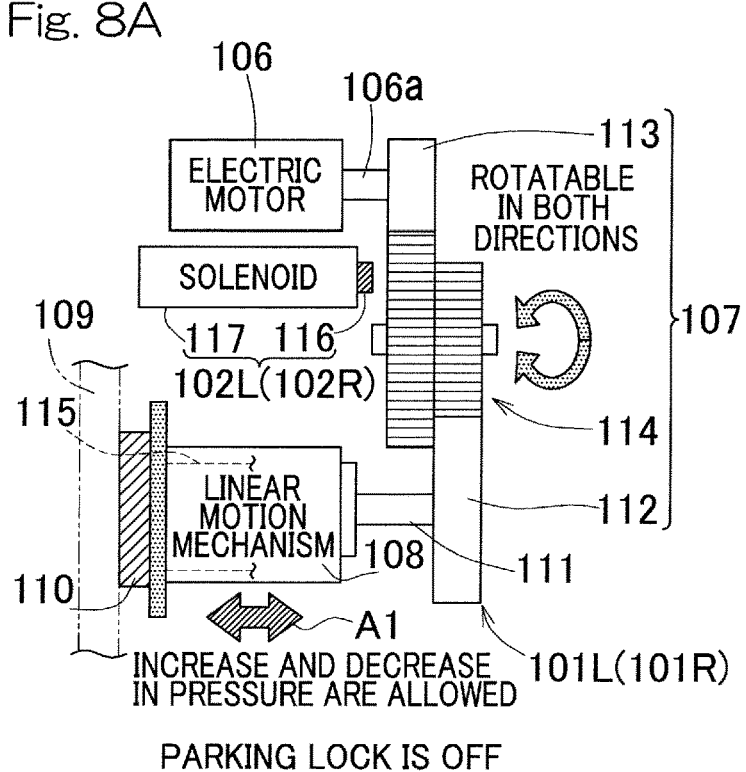
FIG. 8A is a schematic diagram illustrating a non-parking lock state of the electric brake device.
Figure 8B:
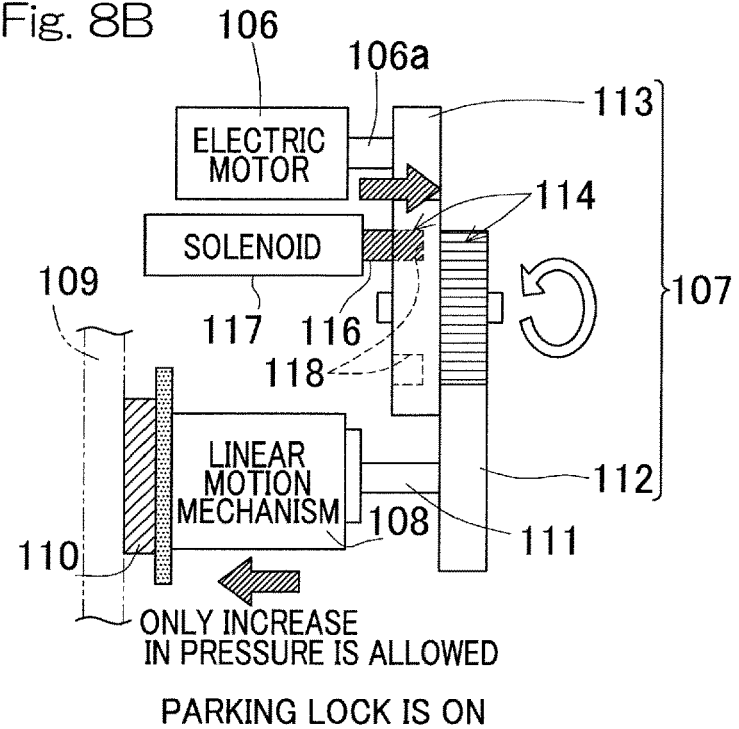
FIG. 8B is a schematic diagram illustrating a parking lock state of the electric brake device.

FIG. 8A is a schematic diagram illustrating a non-parking state lock which is in an off state of this electric brake device, whereas FIG. 8B is a schematic diagram illustrating the parking lock state of the electric brake device. Suppose that, from the state illustrated in FIG. 8A, the actuator 117 is actuated to cause the locking member 116 to advance and make contact with the intermediate gear 114, and the rotation of the electric motor 106 is thereafter stopped. Then, the friction pad 110 is pushed back by a reaction force from the brake rotor 109, and the linearly moving portion 115 of the linear motion mechanism 108 is pushed back to the inboard side.

This reaction force causes each of the gears 112, 114, and 113 to rotate in such a direction as to reduce the pressing force. Even if the locking member 116 is caused to advance at a phase, i.e., at a circumferential position in the intermediate gear 114, at which the locking member 116 encounters no engagement hole 118, or at which any slanting hole portion 118b confronts thereto, the gear 114 rotates in the aforementioned pressure-reducing direction, and a tip or end portion of the locking member 116 slides along one of the slanting hole portions 118b (see FIG. 7B) while being pushed back, whereby the position of the locking member 116 and the position (phase) of the bottomed cylindrical hole portion 118a (see FIG. 7B) of one of the engagement holes 118 coincide eventually (see FIG. 8B). Even if the intermediate gear 114 attempts to rotate further in the aforementioned pressure-reducing direction, a side surface of the locking member 116 is pressed against one circumferential end 118aa of the bottomed cylindrical hole portion 118a as illustrated in FIGS. 7A and 7B, so that further rotation of the intermediate gear 114 is prevented.

As described above, the rotation of the intermediate gear 114 caused by pushing back the linearly moving portion 115 due to the reaction force causes the position of the locking member 116 and the phase (position) of the engagement hole 118 to meet, and causes the locking member 116 to be pressed against the one circumferential end 118aa of the bottomed cylindrical hole portion 118a to be engaged therewith, so that the necessary pressing force is prevented from being reduced.

Figure 9:
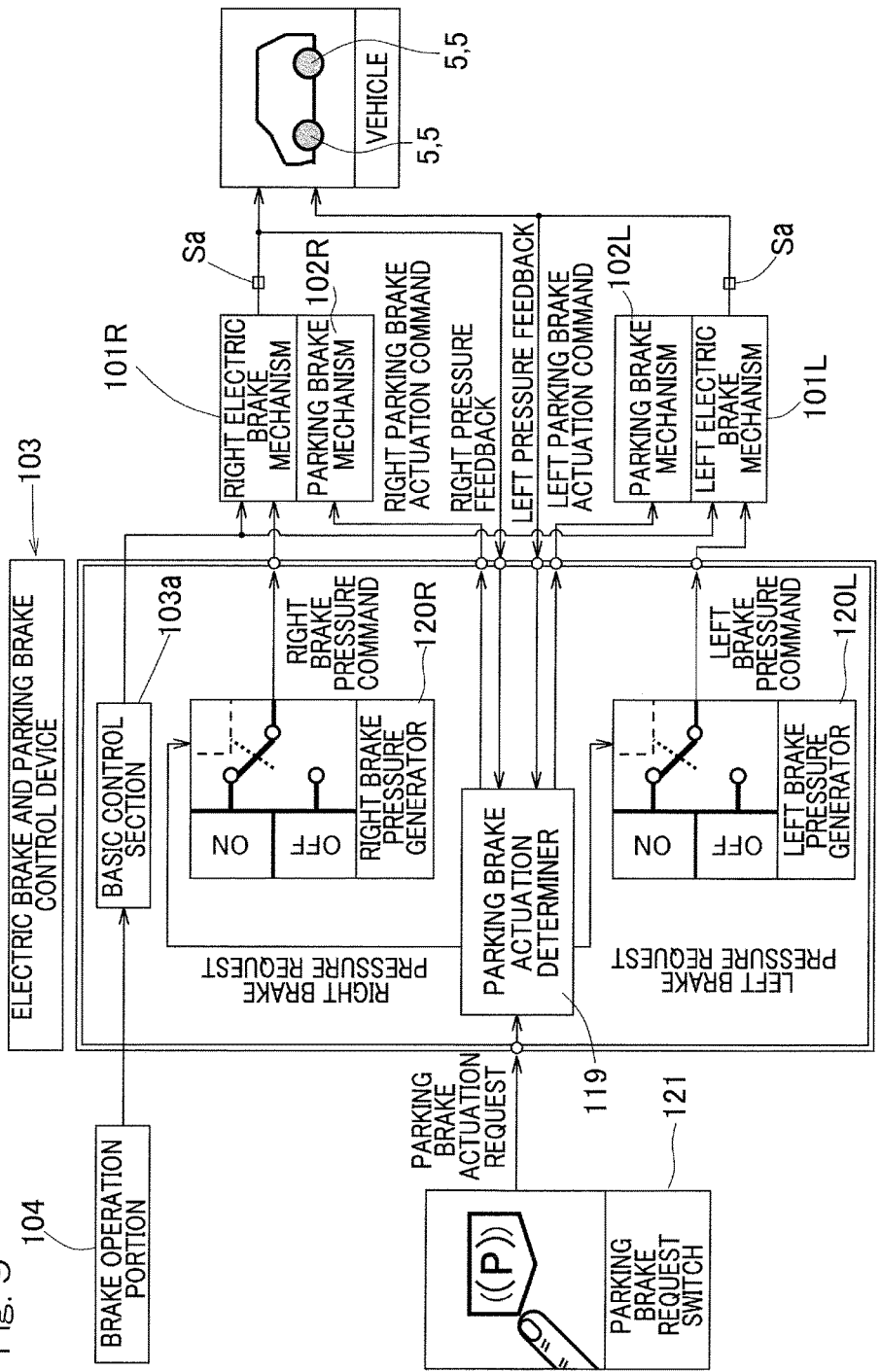
FIG. 9 is a block diagram of a control system for explaining a normal service brake operation and so on of the electric brake device.

FIG. 9 is a block diagram of a control system for explaining a normal service brake operation and so on of this electric brake device. As illustrated in FIGS. 6 and 9, the control device 103 of this electric brake device includes basic control section 103a. The control device 103 is formed by a computer including a processor, a read-only memory (ROM) having a program to be executed by the processor, a random-access memory (RAM), and another electronic circuit, such as a co-processor. In response to an operation of the brake operation portion 104 by the driver, the basic control section 103a causes the electric motor 106 corresponding to each of the left and right electric brake mechanisms 101L and 101R to operate to cause the friction pad 110 to be pressed against the brake rotor 109 thereby to apply the braking force.

Figure 10:
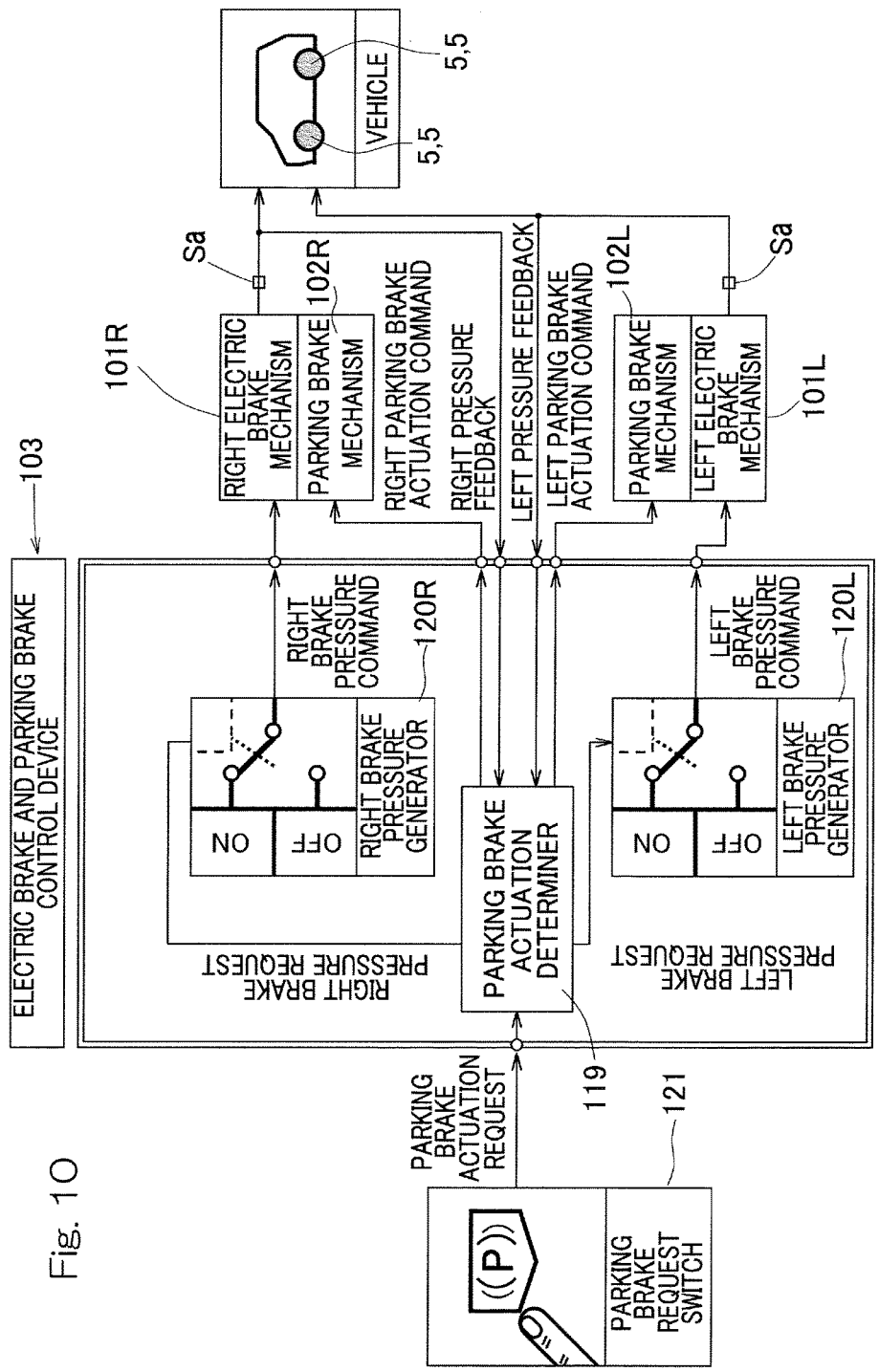
FIG. 10 is a block diagram of a control system of the electric brake device.

FIG. 10 is a block diagram of the control system of this electric brake device, in which the brake operation portion 104 and the basic control section 103a shown in FIG. 9 are not shown for simpler illustration. As illustrated in FIG. 10, the control device 103 of this electric brake device includes a parking brake actuation determiner 119 and left and right brake pressure generators 120L and 120R.

The parking brake actuation determiner 119 adjusts the timing at which each of the parking brake mechanisms 102L and 102R is actuated to shift the state of the corresponding parking brake mechanism 102L or 102R from the unlocked state to the parking lock state, that is, adjusts a series of operations to be performed until the operation of each of the parking brake mechanisms 102L and 102R is completed. Operating the parking brake represents 1) generating a braking force, and 2) keeping the braking force and preventing the braking force from being released even if left uncontrolled. Accordingly, the "series of operations" mentioned above includes generating the braking force (i.e., increasing the pressing force), and keeping the generation of the pressing force (i.e., causing a mechanism for preventing a reverse rotation to function).

As illustrated in FIGS. 6 and 10, when the driver desires to actuate the parking brake mechanisms 102L and 102R, the driver operates the parking brake request switch 121 provided on a console panel or the like of the vehicle, for example. A parking brake actuation request generated as a result is inputted to the parking brake actuation determiner 119. In response to the input of the parking brake actuation request, the parking brake actuation determiner 119 according to this embodiment generates signals of left and right brake pressure request for the left and right brake pressure generators 120L and 120R, respectively. In response to left and right brake pressure requests, the left and right brake pressure generators 120L and 120R output left and right brake pressure commands, respectively. Each of the left and right brake pressure commands is replaced with a set pressing force. The left and right brake pressure commands are inputted to the left and right electric brake mechanisms 101L and 101R, respectively.

In accordance with the respective left and right brake pressure commands, the left and right electric brake mechanisms 101L and 101R drive the respective electric motors 106 to generate the pressing forces of the corresponding friction pads 110. The parking brake actuation determiner 119 detects feedback values of the left and right pressing forces. For example, the relationship between the pressing force and the electric current in the electric motor 106 is recorded beforehand in relationship setting portion (not shown). An electric current sensor Sa that detects the electric current in the electric motor 106 may be provided, and then, the parking brake actuation determiner 119 is able to compute the feedback value of each of the left and right pressing forces, for example, by applying the electric current detected by the electric current sensor Sa to the relationship setting portion, which is a predetermined comparison function, a transform function, and/or the like in a library or which is a lookup table (LUT).

Note that a load sensor (not shown) formed by a strain sensor or the like which detects the reaction force from the brake rotor 109 may alternatively be provided in each of the electric brake mechanisms 101L and 101R, and the parking brake actuation determiner 119 may be configured to obtain the feedback value by detecting the value detected by each load sensor, which is in direct proportion to the pressing force.

The parking brake actuation determiner 119 compares the feedback value of each of the left and right pressing forces with a previously set pressing force (referred to as a pressing force threshold value) required when applying the parking brake. If the parking brake actuation determiner 119 determines that the feedback values of both the left and right pressing forces have exceeded the pressing force threshold value, the parking brake actuation determiner 119 generates a parking brake actuation command for each of the left and right parking brake mechanisms 102L and 102R. In this case, for example, a process of reconfiguring the control flow of the control device 103 may be performed to reduce the uncomfortable feeling and annoyance due to the operating noise so that the structure or arrangement of the electric motor or the speed reduction mechanism is not restricted as in related art. This leads to an improvement in versatility of the electric brake device.

Figure 11:
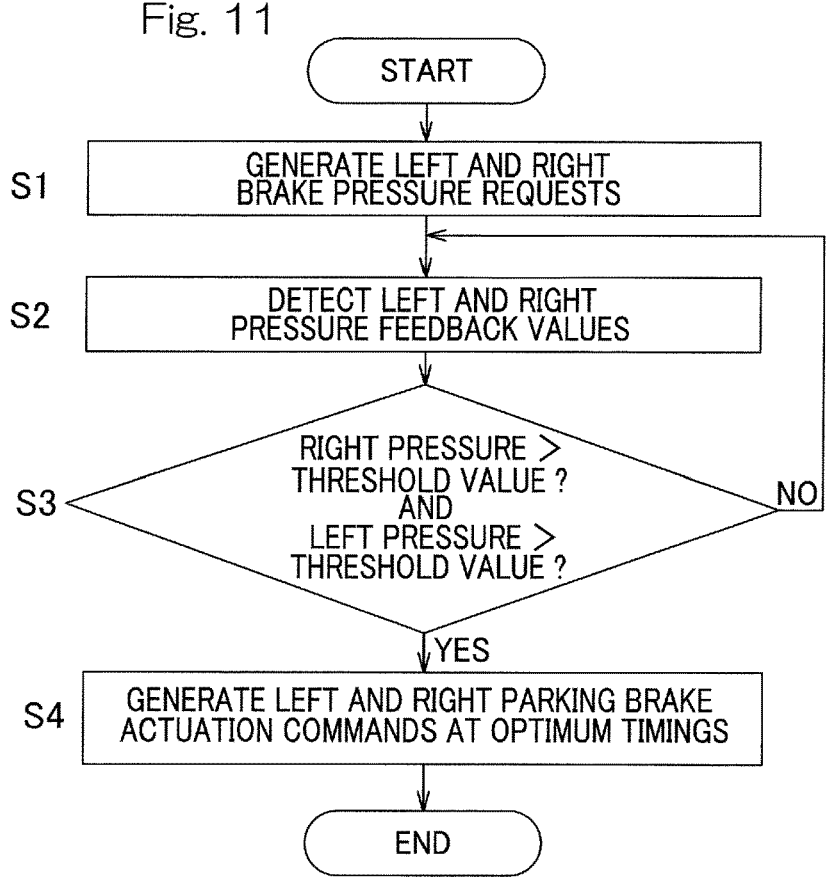
FIG. 11 is a flowchart illustrating a procedure in which a control device of the electric brake device makes left and right brake pressure requests simultaneously.

FIG. 11 is a flowchart illustrating a procedure in which the control device of the electric brake device makes the left and right brake pressure requests simultaneously, and the left and right parking brake mechanisms are actuated simultaneously or one after the other in succession. In the case where the left and right brake pressure requests have been made simultaneously, the left and right parking brake mechanisms may be actuated simultaneously or one after the other in succession, as described below. The following description will be provided with appropriate reference made to FIGS. 6 and 10 as well.

The left and right brake pressure requests are signals inputted from the parking brake actuation determiner 119 to the left and right brake pressure generators 120L and 120R, respectively. In response to the input of the left and right brake pressure requests, the left and right brake pressure generators 120L and 120R output the brake pressure commands to the left and right electric brake mechanisms 101L and 101R, to cause the set pressing forces to be generated, respectively.

Note that it is assumed in the control flow that an operation of the brake pedal is not performed, and only processes of the parking brake mechanisms 102L and 102R will be described. In the example described below, descriptions of a determination as to malfunctioning of the parking brake, a process related to a time limit at a waiting time for condition meeting, and so on are omitted, and it is assumed that such determination and process are appropriately performed as necessary. For the sake of description, it is assumed in the following description that the right parking brake mechanism 102R is actuated before the left parking brake mechanism 102L in the case where the left and right parking brake mechanisms 102L and 102R are actuated one after the other, but it is to be noted that either one of the left and right parking brake mechanisms 102L and 102R may be actuated first.

The present procedure is started when the parking brake request switch 121 has been operated (START), and in response to the input of the parking brake actuation request, the parking brake actuation determiner 119 generates each of the left and right brake pressure requests (step S1). In response to the left and right brake pressure requests, the left and right brake pressure generators 120L and 120R replace the left and right brake pressure commands, which are to be outputted, from a zero pressure command (i.e., a pressure command indicating a zero pressure) to a previously set pressure command required when applying the parking brake. The left and right brake pressure commands are inputted to the left and right electric brake mechanisms 101L and 101R, respectively.

The left and right electric brake mechanisms 101L and 101R generate the pressing forces in accordance with the left and right brake pressure commands, respectively. The left and right pressing forces are outputted from the left and right electric brake mechanisms 101L and 101R as left and right pressure feedback values, respectively. The parking brake actuation determiner 119 obtains the left and right pressure feedback values by, for example, applying the electric current detected by the electric current sensors Sa to the relationship setting portion (step S2). Next, the parking brake actuation determiner 119 compares each of the left and right pressure feedback values with the pressing force threshold value (step S3).

If the parking brake actuation determiner 119 determines that the feedback values of both the left and right pressing forces have exceeded the pressing force threshold value (step S3: yes), the parking brake actuation determiner 119 generates the parking brake actuation commands for the left and right parking brake mechanisms 102L and 102R at respective predetermined timings (step S4). The predetermined timings are, for example, timings of command generation which are determined by a test result to be able to reduce the sound pressure level perceived by the occupant of the vehicle, thus reducing the uncomfortable feeling and annoyance caused to the occupant. Specifically, the predetermined timings are timings at which the left and right parking brake mechanisms 102L and 102R are actuated simultaneously, or timings at which the left and right parking brake mechanisms 102L and 102R are actuated one after the other in succession. The present procedure is thereafter finished.

If the parking brake actuation determiner 119 determines at step S3 that the feedback value of at least one of the left and right pressing forces does not exceed the pressing force threshold value (step S3: no), the procedure goes back to step S2, and the parking brake actuation determiner 119 calculates the feedback values of the left and right pressing forces again, and waits for both the feedback values to exceed the pressing force threshold value. At step S3, although a description of a process (such as error handling) has been assumed to be omitted as mentioned above, error handling or the like may be additionally performed as necessary when the condition is not satisfied within a predetermined time. In the case where the left and right parking brake actuation commands are to be generated simultaneously for both the left and the right at step S4, the parking brake actuation commands are generated for the left and right parking brake mechanisms 102L and 102R when step S4 is performed.

Figure 12:
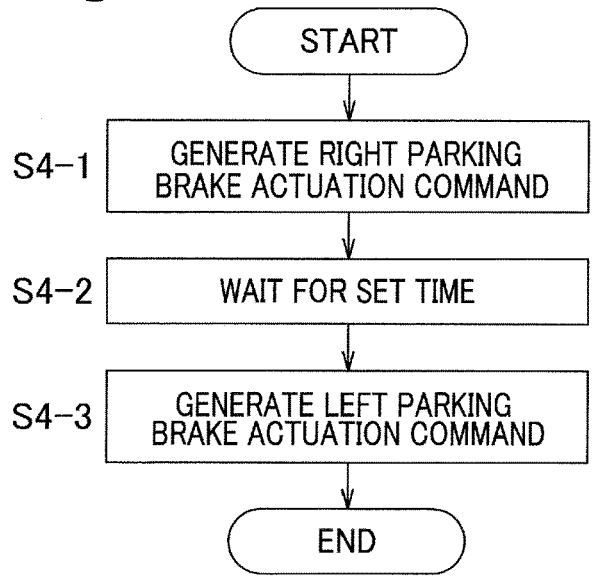
FIG. 12 is a flowchart illustrating a procedure in the case where the control device generates parking brake actuation commands for the left and the right one after the other in succession.

FIG. 12 illustrates a procedure in the case where the parking brake actuation commands are to be generated for the left and the right one after the other in succession at step S4. After the present procedure is started, the parking brake actuation determiner 119 first generates the parking brake actuation command for the right parking brake mechanism 102R (step S4-1). Next, the parking brake actuation determiner 119 waits for a set time to accomplish the timing to reduce the uncomfortable feeling and annoyance (step S4-2).

This set time is, for example, set on the basis of a result of an experiment, a simulation, or the like. Finally, the parking brake actuation determiner 119 generates the parking brake actuation command for the left parking brake mechanism 102L (step S4-3). The present procedure is thereafter finished (END). The other steps S1 to S3 omitted in FIG. 12 remain the same as in FIG. 11. With respect to examples described below as well, in which descriptions of steps S1 to S3 are omitted, the steps S1 to S3 remain the same as in FIG. 11.

In addition to the determination as mentioned above, in order to check whether the locking member 116 of each of the parking brake mechanisms 102L and 102R has been engaged with any engagement hole 118, the parking brake actuation determiner 119 may use a parking brake operation completion signal for a condition for proceeding to the next control step. The parking brake operation completion signal is, for example, a signal based on the fact that one or both of the electric motor 106 and the actuator 117 have operated to a required extent.

Figure 13:
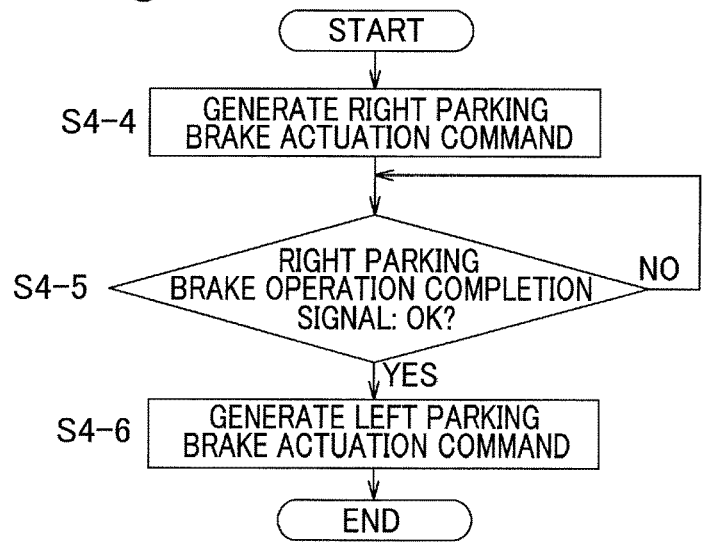
FIG. 13 is a flowchart illustrating a procedure in which the control device determines whether an engagement of a parking brake mechanism of the electric brake device has succeeded.

In the case where this determination is added, step S4 in FIG. 11 is replaced with steps S4-4 to S4-6 in FIG. 13. Specifically, as illustrated in FIG. 13, the parking brake actuation determiner 119 generates the parking brake actuation command first for the right parking brake mechanism 102R (step S4-4), and waits for a detection of the parking brake operation completion signal of the right parking brake mechanism 102R (step S4-5). If the parking brake actuation determiner 119 detects the parking brake operation completion signal (step S4-5: yes), the parking brake actuation determiner 119 generates the parking brake actuation command for the remaining left parking brake mechanism 102L (step S4-6).

Figure 14:
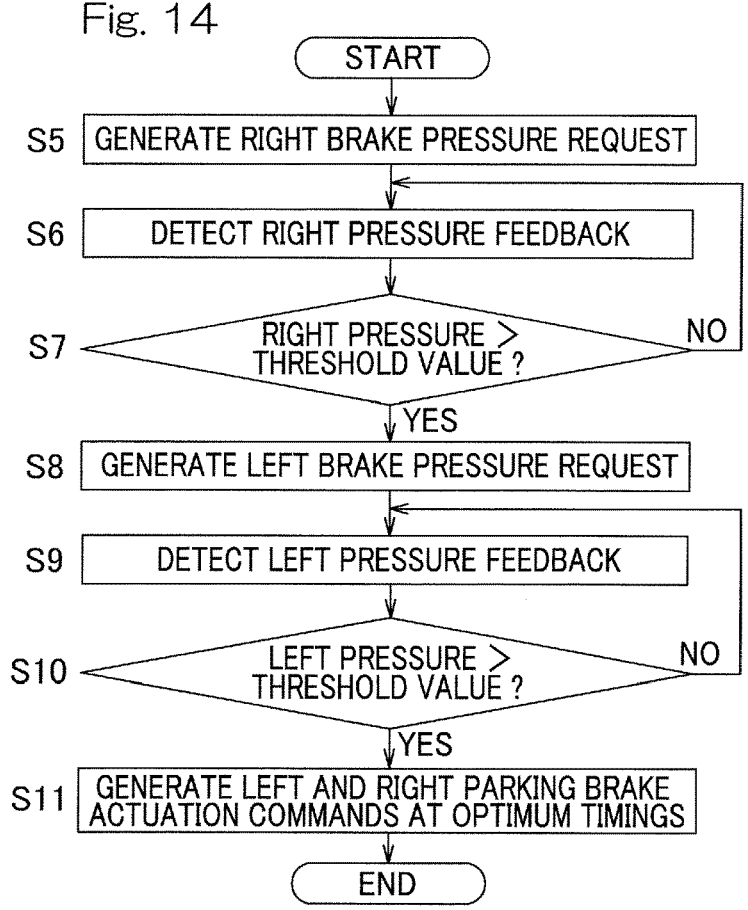
FIG. 14 is a flowchart illustrating a procedure in the case where the control device gradually increases left and right brake pressures.

Next, a procedure in which the control device 103 gradually increases the left and right brake pressing forces will now be described below with reference to a flowchart of FIG. 14. In response to receipt of the parking brake actuation request, the parking brake actuation determiner 119 generates the right brake pressure request (step S5). In response to the right brake pressure request, the right brake pressure generator 120R replaces the right brake pressure command from the zero pressure command to the previously set pressure command required when applying the parking brake.

The right brake pressure command is inputted to the right electric brake mechanism 101R, and the right electric brake mechanism 101R generates the pressing force in accordance with the right brake pressure command. The pressing force at this time is outputted as the right pressure feedback value, and the parking brake actuation determiner 119 detects the right pressure feedback value (step S6). Next, the parking brake actuation determiner 119 compares the right pressure feedback value with the pressing force threshold value (step S7).

If it is determined that the right pressure feedback value is equal to or less than the pressing force threshold value (step S7: no), the procedure goes back to step S6. If the parking brake actuation determiner 119 recognizes that the right pressure feedback value has exceeded the pressing force threshold value (step S7: yes), the parking brake actuation determiner 119 generates the left brake pressure request (step S8). In response to the left brake pressure request, the left brake pressure generator 120L replaces the left brake pressure command from the zero pressure command to the previously set pressure command required when applying the parking brake.

As a result, the left electric brake mechanism 101L generates the pressing force in accordance with the left brake pressure command. The parking brake actuation determiner 119 detects the left pressure feedback value outputted from the left electric brake mechanism 101L (step S9). Next, the parking brake actuation determiner 119 compares the left pressure feedback value with the pressing force threshold value (step S10). If it is determined that the left pressure feedback value is equal to or less than the pressing force threshold value (step S10: no), the procedure goes back to step S9.

If the parking brake actuation determiner 119 recognizes that the left pressure feedback value has exceeded the pressing force threshold value (step S10: yes), the parking brake actuation determiner 119 generates the parking brake actuation commands for the left and right parking brake mechanisms 102L and 102R at the predetermined timings (step S11). The timings at which the left and right parking brake actuation commands are generated at this time are timings of command generation which are able to reduce the uncomfortable feeling and annoyance as described above. The present procedure is thereafter finished (END).

In the case where the left and right parking brake actuation commands are to be generated simultaneously at step S11, the parking brake actuation determiner 119 generates the parking brake actuation commands for the left and right parking brake mechanisms 102L and 102R when step S11 is performed, as when step S4 is performed. In the case where the left and right parking brake actuation commands are to be generated one after the other in succession, steps S4-1 to S4-3 illustrated in FIG. 12 are similarly performed at step S11. In the case where the determination as to whether the locking member 116 of each of the parking brake mechanisms 102L and 102R has been engaged with any engagement hole 118 using the parking brake operation completion signal is added, step S11 is replaced with steps S4-4 to S4-6 in FIG. 13.

Other than the division and order of the exemplary series of operations described above, some combinations are conceivable, for example, a method of arranging the operations in the order of 1) generating the right brake pressing force, 2) actuating the right parking brake, 3) generating the left brake pressing force, and 4) actuating the left parking brake, or, in the case where operating noise occurs at the beginning of an increase in the pressing force, a method of arranging the operations in the order of 1) generating the right brake pressing force, 2) waiting for a predetermined time, 3) generating the left brake pressing force, and 4) comparing each of the left and right pressing forces with the pressing force threshold value. Even in the case where the order and timings of the operations required as a result of a sensory evaluation are different from those exemplified above, the control blocks illustrated in FIG. 10 can be used to accomplish the required operations with a simple rearrangement of the control flow. This simple rearrangement means rearranging the order in which the steps are performed so that the steps will be performed in a required order, without changing the content of the process within each step.

Example modifications of the third embodiment will now be described below. In the following description, components or features that have their equivalents in the preceding embodiments described above will be denoted by the same reference numerals as those of their equivalents, and redundant description will be omitted. When only a part of such a component or feature is described, the remaining part of the component or feature should be understood to remain the same as in the preceding embodiments unless otherwise noted. Like components or features produce like advantageous effects. Components or features described specifically in different embodiments may be combined, and different embodiments may be partially combined as long as no conflict arises from the combination.

Figure 15:
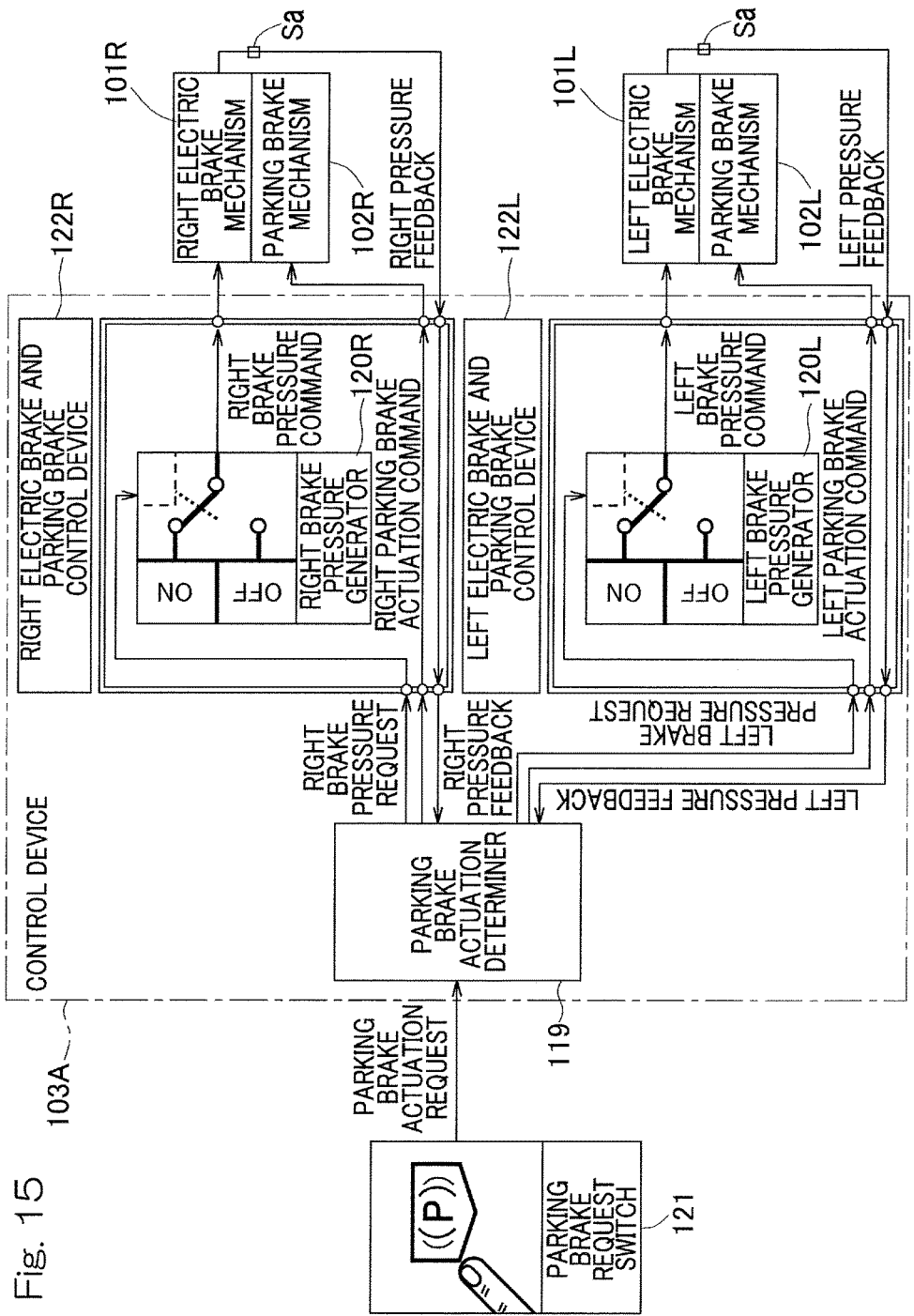
FIG. 15 is a block diagram of a control system of an electric brake device according to a modification of the third embodiment.

FIG. 15 is a block diagram of a control system of an electric brake device according to a modification of the third embodiment. A control device 103A of this electric brake device includes a parking brake actuation determiner 119 and left and right electric brake and parking brake control devices 122L and 122R. The electric brake and parking brake control devices 122L and 122R are provided with brake pressure generators 120L and 120R, respectively, and the parking brake actuation determiner 119 is provided outside of these electric brake and parking brake control devices 122L and 122R.

In the third embodiment, the case where the parking brake actuation determiner 119 is inside the electric brake and parking brake control device has been assumed. In the case where two electric brake devices, i.e., the left and right electric brake devices, are configured to be controlled by a single electric brake and parking brake control device, the parking brake actuation determiner 119 may be either inside or outside the electric brake and parking brake control device, and there is no necessity for the parking brake actuation determiner 119 to be either inside or outside the electric brake and parking brake control device.

However, in the case of FIG. 15, in which each electric brake and parking brake control device 122L (122R) is configured to control one electric brake device, it is preferable that the parking brake actuation determiner 119 be provided outside of the electric brake and parking brake control devices 122L and 122R. This is because a component that monitors the states of the left and right (i.e., two) electric brake mechanisms 101L and 101R and the left and right (i.e., two) parking brake mechanisms 102L and 102R simultaneously is necessary, and providing the parking brake actuation determiner 119 outside of the electric brake and parking brake control devices 122L and 122R allows a simpler configuration and greater practicality for centralized control over actuation timings.

In the case where the parking brake actuation determiner 119 is provided inside any electric brake and parking brake control device, one of the left and right electric brake and parking brake control devices needs to be configured to monitor both of the state simultaneously as described above, or the left and right electric brake and parking brake control devices need to be configured to communicate with each other and monitor the pressure feedback values therebetween to adjust each actuation timing therebetween, or one of the left and right electric brake and parking brake control devices needs to have the right of priority, as typified by a master-slave relation, and monitor the pressure feedback values through communication to determine each actuation timing. Adoption of such a configuration results in complicated control and configuration, and is not advantageous from the viewpoint of reducing an uncomfortable feeling and annoyance caused by operating noise.

Even in the case where the parking brake actuation determiner 119 is provided outside of the electric brake and parking brake control devices 122L and 122R, the control flow can exercise control still in a manner as described above. As illustrated in FIG. 15, pieces of information such as the parking brake actuation commands and the feedback values of the pressing forces are exchanged between the parking brake actuation determiner 119 and the parking brake mechanisms 102L and 102R and the electric brake mechanisms 101L and 101R through the electric brake and parking brake control devices 122L and 122R.

A practical method to realize the above is to connect each of the electric brake and parking brake control devices 122L and 122R with a higher-level integrated controller (not shown) of the vehicle and the parking brake actuation determiner 119 via intercommunication means, such as CAN bus communication, to allow necessary pieces of information to be transmitted and received collectively. Thus, an increase in the number of pieces of information does not lead to an addition of a signal line.

The parking brake actuation commands and the feedback values of the pressing forces may be exchanged directly between the parking brake actuation determiner 119 and the electric brake mechanisms 101L and 101R and the parking brake mechanisms 102L and 102R without intervention of the electric brake and parking brake control devices 122L and 122R. However, in the case where the feedback value of the pressing force is required when the electric brake is controlled, and in the case where collective transmission and reception of necessary pieces of information are possible, exchanging of the signals without the intervention of the electric brake and parking brake control devices 122L and 122R is probably inefficient.

In the foregoing description, it has been assumed that there is not a brake pedal pressure request inputted through the brake pedal 104, to avoid confusion in description. However, the parking brake mechanisms 102L and 102R and the electric brake mechanisms 101L and 101R, which are to be controlled, are required to operate without causing a logical inconsistency for both the operations of the parking brake mechanisms 102L and 102R and the inputted pressure request through the brake pedal. Accordingly, it is desirable to add a pressure command adder 123 as illustrated in FIG. 16 to the configuration described above.

Figure 16:
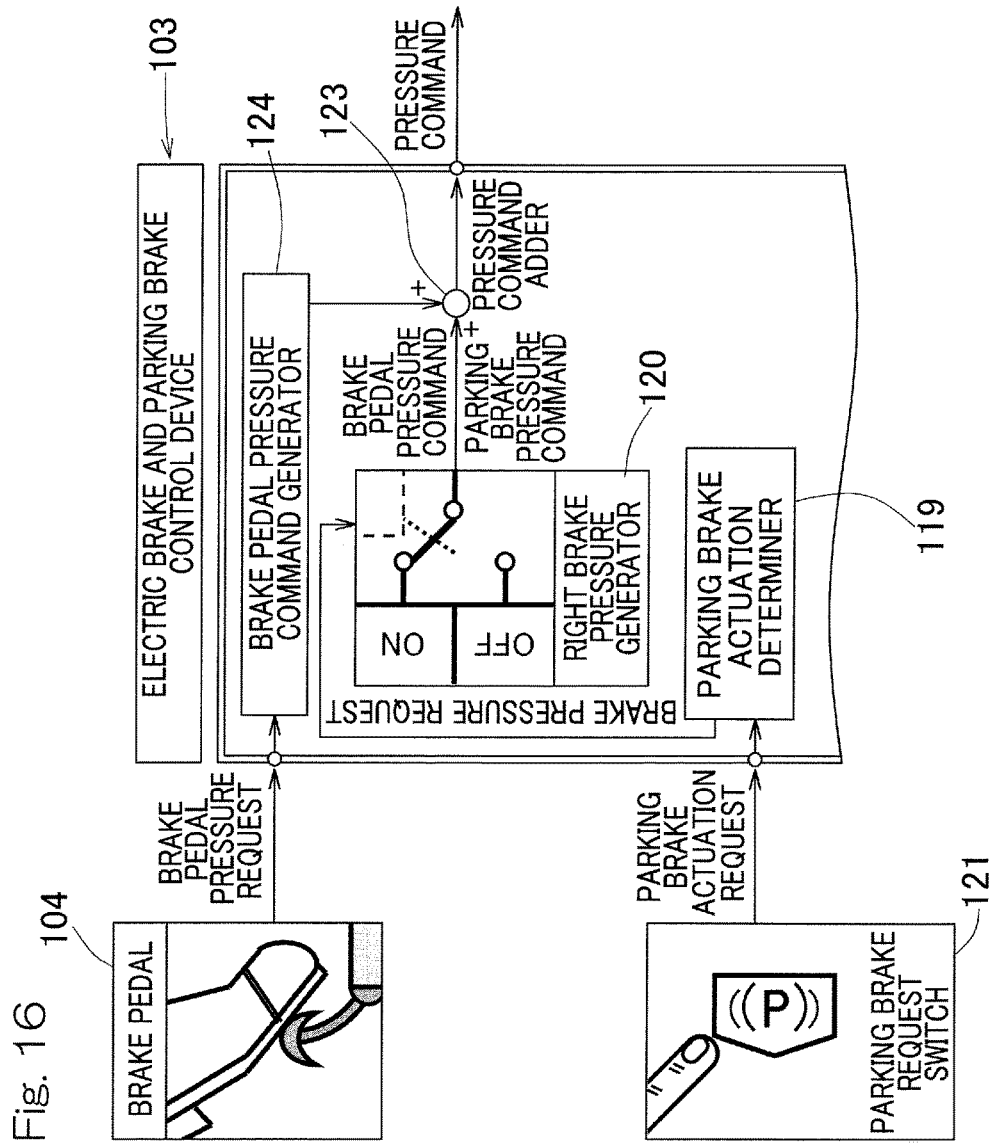
FIG. 16 is a block diagram of a control system of an electric brake device according to another modification of the third embodiment.

FIG. 16 illustrates another modification of the third embodiment, in which an electric brake and parking brake control device includes a parking brake actuation determiner 119, a brake pressure generator 120 (for a right brake in the example of FIG. 16), a brake pedal pressure command generator 124, and the pressure command adder 123. The brake pedal pressure command generator 124 generates a brake pedal pressure command on the basis of the brake pedal pressure request inputted through the brake pedal 104. The brake pedal pressure command is inputted to the pressure command adder 123.

In response to receipt of a parking brake actuation request, the parking brake actuation determiner 119 generates a brake pressure request (for the right brake in the example of FIG. 16) at a predetermined timing. The brake pressure generator 120 inputs a required pressure command (referred to as a parking brake pressure command) into the pressure command adder 123. The pressure command adder 123 adds the above-mentioned two pressure commands together, and outputs the result as a total pressure command.

In the configuration of FIG. 16, the pressure command adder 123 may be replaced with a pressure command selector. The pressure command selector can take the place of the pressure command adder 123, and is configured to select the greater one of the two inputted pressure commands, and output the greater pressure command as the total pressure command. In the case where the pressure command adder 123 is used, and even in the case where the vehicle is likely to undesirably roll backward on an incline, for example, when the parking brake mechanisms have been used, pressing the brake pedal will immediately increase the braking force and can prevent the vehicle from rolling backward. However, in the case where a high pressing force is generated at the time of the parking brake, a brake locking may result with a high probability.

In the case where the pressure command selector is used, and in the case where a high pressing force is generated at the time of the parking brake, the pressure does not change until a pedal travel that generates a command value that exceeds a command value thereof is reached, and a reaction to the rolling backward of the vehicle may be delayed. However, the relationship between the pedal travel and the pressing force remains the same as that at the time of normal driving, the likelihood of a brake locking can be reduced to a low level.

Figure 17:
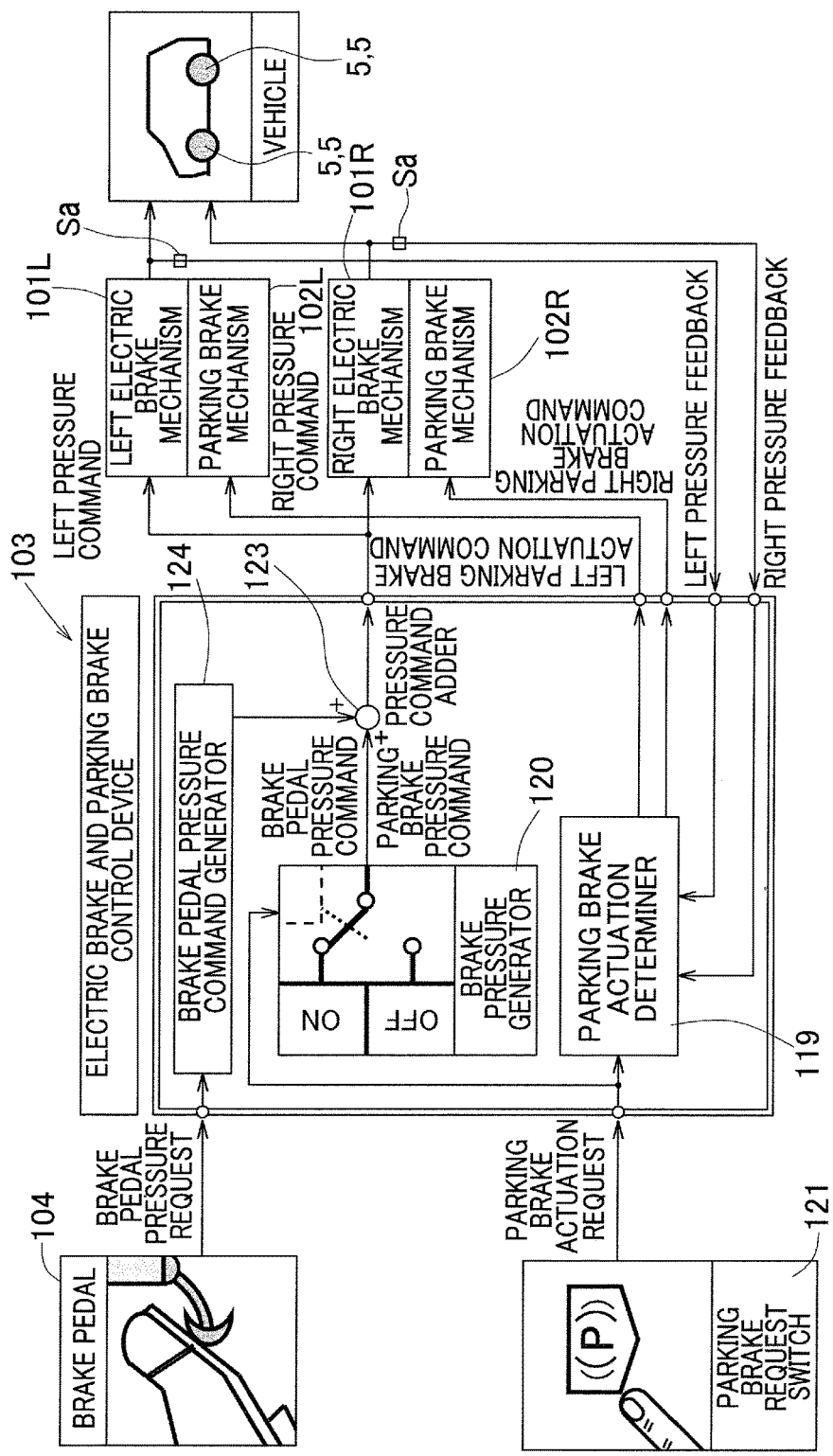
FIG. 17 is a block diagram of a control system of an electric brake device according to yet another modification of the third embodiment.

The foregoing description is based on the viewpoint that noise that is made when the pressing force is increased, noise that is made when the locking member of the parking brake mechanism is brought into engagement with any engagement hole, and the like are examples of operating noises that cause the uncomfortable feeling, and that timings at which the aforementioned two types of noise are generated should both be managed. However, in the case where such noise is small enough to eliminate the need to manage the timing of the generation thereof, one or more of the control blocks may be omitted as necessary. FIG. 17 illustrates a specific configuration according to yet another modification of the third embodiment. This control flow has been configured on the basis of the viewpoint that it is not necessary to manage the timing of the generation of the noise that is made when the pressing force is increased.

The control flow is substantially equivalent to that of FIG. 11. Signal flow is changed in relation to a brake pressure generator 120. Once a driver presses a parking brake request switch 121, a parking brake actuation request is directly inputted to the brake pressure generator 120, and both left and right parking brake pressure commands are immediately replaced from a zero pressure command to a previously set pressure command required when applying a parking brake respectively. The processes subsequent to step S1 of FIG. 11 remain substantially the same as when the control flow of FIG. 11 is performed using the control blocks of FIG. 10.

From the viewpoint of determining the timing of command generation that reduces the uncomfortable feeling and annoyance, it is conceivable to determine the timing of a command to actuate the parking brake taking into consideration any operating noise that is caused by another mechanism that is actuated when the parking brake is actuated. A specific example of such other mechanisms is a door lock or the like. In the case where the parking brake is actuated when an occupant is in the vehicle, a released door lock will be convenient for the occupant.

In the case where the door lock is accordingly configured to be released when the parking brake is actuated, operating noise is generated when the door lock is released, and therefore, the timing of command generation may be adjusted so that the operating noise due to the actuation of the parking brake will occur simultaneously therewith. Even in this case, the uncomfortable feeling and annoyance due to the actuation of the parking brake can be reduced.

As aspect presented next is an aspect that does not have, as requirements thereof, the following requirements of each of the embodiments described above, which have been described with reference to the first embodiment: "left and right brake mechanisms configured to independently apply braking forces to left and right wheels of a vehicle, respectively, and hold the vehicle stationary", "a control device configured to control these brake mechanisms", and "a parking brake actuation determiner configured to adjust respective timings at which the left and right brake mechanisms are actuated so as to reduce an uncomfortable feeling caused to an occupant of the vehicle".

Aspect 1

An electric brake device equipped with parking brakes, the electric brake device including:

left and right electric brake mechanisms configured to be capable of independently applying braking forces to left and right wheels of a vehicle, respectively, and to be operated by a driver through a brake operation portion;

each of left and right parking brake mechanisms configured to be capable of independently switching between a parking lock state, in which the parking brake mechanism prevents the braking force by a corresponding one of the left and right electric brake mechanisms from being released, and an unlocked state, in which the parking brake mechanism permits the braking force to be released; and a control device configured to control the left and right electric brake mechanisms and the left and right parking brake mechanisms, wherein the control device includes a parking brake actuation determiner configured to adjust respective timings at which the left and right parking brake mechanisms are actuated to shift from the unlocked state to the parking lock state so as to reduce an uncomfortable feeling caused to an occupant of the vehicle.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1L, 1R . . . left and right parking brake mechanism
2 . . . control device
5 . . . wheel
12 . . . parking brake actuation determiner
14 . . . set time observer
15 . . . actuation command suspending section
16 . . . operation completion signal monitor
17 . . . actuation command sequential input section
101L, 101R . . . electric brake mechanism
102L, 102R . . . parking brake mechanism
103 . . . control device
104 . . . brake operation portion
106 . . . electric motor
107 . . . speed reduction mechanism
108 . . . linear motion mechanism
109 . . . brake rotor
110 . . . friction pad
116 . . . locking member
117 . . . actuator
118 . . . engagement hole
119 . . . parking brake actuation determiner
120L, 120R . . . brake pressure generator

What is claimed is:

1. A brake device comprising:
left and right parking brake mechanisms configured to independently apply braking forces to left and right wheels of a vehicle, respectively, and hold the vehicle stationary; and
a control device configured to control these parking brake mechanisms,
the control device including a parking brake actuation determiner configured to adjust respective timings at which the left and right parking brake mechanisms are actuated so as to reduce an uncomfortable feeling caused to an occupant of the vehicle,
wherein the parking brake actuation determiner includes
a set time observer configured to input a parking brake actuation command into one of the left and right parking brake mechanisms, and determine whether a predetermined set time has elapsed, and
an actuation command suspending section configured to input a parking brake actuation command into the other of the left and right parking brake mechanisms based on the set time observer determining that the set time has elapsed.

2. The brake device as claimed in claim 1, wherein, in response to input of a parking brake actuation request from a driver of the vehicle, the parking brake actuation determiner inputs a parking brake actuation command into each of the left and right parking brake mechanisms on the basis of a set timing to reduce the uncomfortable feeling caused to the occupant of the vehicle, thereby to cause the vehicle to enter into a parking lock state in which the vehicle is held stationary.

3. The brake device as claimed in claim 1, wherein the parking brake actuation determiner includes:
an operation completion signal monitor configured to input a parking brake actuation command into one of the left and right parking brake mechanisms, and perform monitoring for an operation completion signal indicating a completion of an operation of the one of the left and right parking brake mechanisms; and
an actuation command sequential input section configured to input a parking brake actuation command into the other of the left and right parking brake mechanisms in response to a detection of the operation completion signal by the operation completion signal monitor.

4. The brake device as claimed in claim 1, wherein the parking brake actuation determiner actuates the left and right parking brake mechanisms simultaneously in accordance with the timings.

5. The brake device as claimed in claim 1, wherein the parking brake actuation determiner adjusts both the timing at which each of the left and right parking brake mechanisms is actuated and a timing at which a predetermined mechanism in the vehicle that generates operating noise is actuated so as to reduce the uncomfortable feeling caused to the occupant of the vehicle.

6. The brake device as claimed in claim 1, further comprising left and right electric brake mechanisms configured to be capable of independently applying braking forces to the left and right wheels, respectively, and to be operated by a driver through a brake operation portion, wherein
each of the left and right parking brake mechanisms is capable of independently switching between a parking lock state, in which the parking brake mechanism prevents the braking force by a corresponding one of the left and right electric brake mechanisms from being released, and an unlocked state, in which the parking brake mechanism permits the braking force to be released,
the control device controls the left and right electric brake mechanisms and the left and right parking brake mechanisms, and
the parking brake actuation determiner adjusts respective timings at which the left and right parking brake mechanisms are actuated to shift from the unlocked state to the parking lock state so as to reduce the uncomfortable feeling caused to the occupant of the vehicle.

7. The brake device as claimed in claim 6, wherein
each electric brake mechanism includes an electric motor, a brake rotor, a friction pad caused to make contact with the brake rotor to generate the braking force, a speed reduction mechanism configured to reduce a speed of rotation of the electric motor, and a linear motion mechanism configured to convert a rotational motion outputted from the speed reduction mechanism into a linear motion of the friction pad, and each parking brake mechanism includes:

a locking member to be engaged with an engagement hole defined in the speed reduction mechanism; and an actuator configured to drive the locking member so as to switch between the parking lock state, in which the locking member is engaged with the engagement hole to restrict the rotational motion of the speed reduction mechanism, and the unlocked state, in which the locking member is out of engagement with the engagement hole.

8. The brake device as claimed in claim 6, wherein the control device includes left and right brake pressure generators configured to output brake pressure commands to the left and right electric brake mechanisms, respectively, to cause the left and right electric brake mechanisms to generate a set pressing force, in response to input of a brake pressure request signal from the parking brake actuation determiner.

9. The brake device as claimed in claim 8, wherein, in response to input of a parking brake actuation request, the parking brake actuation determiner generates the brake pressure request signal for each of the left and right brake pressure generators on the basis of a set timing.

10. The brake device as claimed in claim 8, wherein the parking brake actuation determiner monitors a feedback value of a pressing force generated by each electric brake mechanism after outputting the brake pressure request signal for each of the left and right brake pressure generators, and, when the pressing force has exceeded a threshold value, generates a parking brake actuation command for each of the left and right parking brake mechanisms on the basis of a set timing to cause each of the left and right parking brake mechanisms to enter into the parking lock state.

11. The brake device as claimed in claim 8, wherein after outputting the brake pressure request signal for each of the left and right brake pressure generators, the parking brake actuation determiner generates a parking brake actuation command for each of the left and right parking brake mechanisms to cause each of the left and right parking brake mechanisms to enter into the parking lock state, in accordance with a predetermined condition; and the parking brake actuation determiner outputs the respective brake pressure request signals for the left and right brake pressure generators and the respective parking brake actuation commands for the left and right parking brake mechanisms on the basis of set timings.

12. The brake device as claimed in claim 1, wherein the set time is a time from the generation of the parking brake actuation command for the one parking brake mechanism to a completion of an operation of the one parking brake mechanism.

* * * * *